US010261660B2

(12) United States Patent
Ramanathan et al.

(10) Patent No.: US 10,261,660 B2
(45) Date of Patent: Apr. 16, 2019

(54) ORBIT VISUALIZATION ANIMATION

(71) Applicant: Oracle International Corporation, Redwood Shores, CA (US)

(72) Inventors: Jairam Ramanathan, Waltham, MA (US); Prashant Singh, Lexington, MA (US); Yi Dai, Winchester, MA (US); Jindrich Dinga, Santa Clara, CA (US); David Kamholz, Lyons, CO (US)

(73) Assignee: Oracle International Corporation, Redwood Shores, CA (US)

( * ) Notice: Subject to any disclaimer, the term of this patent is extended or adjusted under 35 U.S.C. 154(b) by 266 days.

(21) Appl. No.: 14/684,151

(22) Filed: Apr. 10, 2015

(65) Prior Publication Data

US 2015/0378564 A1 Dec. 31, 2015

Related U.S. Application Data

(60) Provisional application No. 62/053,638, filed on Sep. 22, 2014, provisional application No. 62/017,214, filed on Jun. 25, 2014.

(51) Int. Cl.
*G06T 11/20* (2006.01)
*G06T 13/80* (2011.01)
(Continued)

(52) U.S. Cl.
CPC ........ *G06F 3/0482* (2013.01); *G06F 3/04817* (2013.01); *G06F 3/04842* (2013.01);
(Continued)

(58) Field of Classification Search
CPC ............... G06F 3/0482; G06F 3/04842; G06F 3/04817; G06F 3/04883; H04L 67/10; G06T 11/206; G06T 13/80; G06T 2200/24
See application file for complete search history.

(56) References Cited

U.S. PATENT DOCUMENTS 5,606,654 A * 2/1997 Schuur ..................... G09G 5/00
345/440
5,721,853 A * 2/1998 Smith .................... G06F 3/0481
715/790
(Continued)

OTHER PUBLICATIONS

Racoma; J. Angelo—"Workday for iPad Launches; Makes ERP More Intuitive With 'Swirls' Interface" obtained at http://www.cmswire.com/cms/information-management/workday-for-ipad-launches-makes-erp-more-intuitive-with-swirls-interface-012252.php#null; Aug. 5, 2011; 5 pages.

(Continued)

*Primary Examiner* — Justin R. Blaufeld
(74) *Attorney, Agent, or Firm* — Trellis IP Law Group, PC

(57) ABSTRACT

A system and method for transitioning a displayed visualization from a first state to a second state. An example method includes displaying an orbit visualization characterized by a first state, wherein the orbit visualization includes a parent node and one or more child nodes positioned about a first orbit path that at least partially circumscribes the parent node; selectively initiating navigation of the orbit visualization; transitioning display of the parent node and one or more child nodes in accordance with the navigation by animating repositioning of the parent node and the one or more child nodes on a user interface display screen, such that a resulting node positioning characterizes the orbit visualization in the second state representative of a navigated-to location. The navigation may represent a downward or upward navigation of hierarchically related data, such that the animation illustrates separation of one or more petals from a selected node or movement toward the selected node, respectively.

20 Claims, 16 Drawing Sheets

(51) Int. Cl.
  *H04L 29/08* (2006.01)
  *G06F 3/0481* (2013.01)
  *G06F 3/0482* (2013.01)
  *G06F 3/0484* (2013.01)
  *G06F 3/0488* (2013.01)

(52) U.S. Cl.
  CPC ........ *G06F 3/04883* (2013.01); *G06T 11/206* (2013.01); *G06T 13/80* (2013.01); *G06T 2200/24* (2013.01); *H04L 67/10* (2013.01)

(56) References Cited

U.S. PATENT DOCUMENTS

| | | | | |
|---|---|---|---|---|
| 6,111,578 | A * | 8/2000 | Tesler | G06T 11/206 345/419 |
| 6,154,213 | A * | 11/2000 | Rennison | G06F 17/30716 345/428 |
| 6,448,987 | B1 * | 9/2002 | Easty | G06F 3/0482 715/834 |
| 7,315,985 | B1 | 1/2008 | Gauvin | H04L 41/12 715/734 |
| 8,332,782 | B1 * | 12/2012 | Chang | H04L 12/6418 707/794 |
| 8,769,438 | B2 * | 7/2014 | Mangum | G06F 3/0488 715/784 |
| 8,954,887 | B1 * | 2/2015 | Tseng | G06F 3/04812 715/808 |
| 9,063,563 | B1 * | 6/2015 | Gray | G06F 3/01 |
| 9,223,463 | B1 * | 12/2015 | Kawaguchi | G06F 3/0481 |
| 9,258,195 | B1 * | 2/2016 | Pendleton | H04L 41/12 |
| 9,292,052 | B2 * | 3/2016 | Hsu | G06F 3/0488 |
| 9,786,071 | B2 * | 10/2017 | Fulford | G06T 11/60 |
| 2002/0113816 | A1 * | 8/2002 | Mitchell | G06F 3/0481 715/734 |
| 2002/0147805 | A1 * | 10/2002 | Leshem | G06F 11/32 709/223 |
| 2003/0050906 | A1 * | 3/2003 | Clifton-Bligh | G06F 3/0481 |
| 2003/0210284 | A1 * | 11/2003 | Vandruff | G06F 17/30994 715/853 |
| 2004/0095395 | A1 * | 5/2004 | Kurtenbach | G06F 3/0482 715/810 |
| 2004/0215764 | A1 * | 10/2004 | Allen | H04L 41/12 709/224 |
| 2005/0273730 | A1 * | 12/2005 | Card | G06F 17/30873 715/853 |
| 2005/0289478 | A1 * | 12/2005 | Landman | G06F 3/048 715/804 |
| 2006/0036568 | A1 * | 2/2006 | Moore | G06F 17/30126 |
| 2006/0059435 | A1 * | 3/2006 | Molesky | G06F 3/0485 715/786 |
| 2007/0192739 | A1 * | 8/2007 | Hunleth | G06F 3/0481 715/823 |
| 2007/0198949 | A1 * | 8/2007 | Rummel | G06F 3/0482 715/810 |
| 2007/0208840 | A1 * | 9/2007 | McConville | H04L 41/22 709/223 |
| 2007/0250793 | A1 * | 10/2007 | Miura | G06F 3/0482 715/810 |
| 2007/0261007 | A1 * | 11/2007 | Hutcheson | G06F 3/0482 715/853 |
| 2009/0007015 | A1 * | 1/2009 | Mandic | G06F 3/0482 715/834 |
| 2009/0327963 | A1 * | 12/2009 | Mouilleseaux | G06F 3/0482 715/834 |
| 2010/0058165 | A1 * | 3/2010 | Bhattacharya | H04L 63/1416 715/227 |
| 2010/0269040 | A1 * | 10/2010 | Lee | G06F 3/04817 715/702 |
| 2010/0287512 | A1 * | 11/2010 | Gan | G06F 17/30572 715/854 |
| 2010/0306702 | A1 * | 12/2010 | Warner | G06F 3/0482 715/811 |
| 2011/0093815 | A1 * | 4/2011 | Gobeil | G06F 3/0482 715/825 |
| 2011/0239163 | A1 * | 9/2011 | Mochizuki | G06F 3/0482 715/853 |
| 2011/0265041 | A1 * | 10/2011 | Ganetakos | A63F 13/533 715/834 |
| 2011/0289459 | A1 * | 11/2011 | Athans | G06F 3/0481 715/854 |
| 2011/0316884 | A1 * | 12/2011 | Giambalvo | G06F 17/30058 345/660 |
| 2012/0036484 | A1 * | 2/2012 | Zhang | H04L 41/12 715/853 |
| 2012/0272144 | A1 * | 10/2012 | Radakovitz | G06F 3/04883 715/702 |
| 2013/0014053 | A1 * | 1/2013 | Cabrera-Cordon | G06F 3/0488 715/810 |
| 2013/0019173 | A1 * | 1/2013 | Kotler | G06F 3/0482 715/711 |
| 2013/0024811 | A1 * | 1/2013 | Gleadall | G06F 3/0482 715/810 |
| 2013/0067398 | A1 * | 3/2013 | Pittappilly | G06F 3/0482 715/800 |
| 2013/0117705 | A1 * | 5/2013 | Ting | H04M 1/67 715/781 |
| 2013/0223614 | A1 * | 8/2013 | Tuchman | H04M 3/523 379/265.09 |
| 2013/0227474 | A1 * | 8/2013 | Dondurur | G06F 3/0482 715/808 |
| 2013/0332378 | A1 * | 12/2013 | Brown | G06Q 10/105 705/319 |
| 2013/0336578 | A1 * | 12/2013 | Sakashita | C04B 38/00 382/154 |
| 2014/0026104 | A1 * | 1/2014 | Tokita | G06F 3/04817 715/854 |
| 2014/0047361 | A1 * | 2/2014 | Gaspar | G06F 3/048 715/762 |
| 2014/0053110 | A1 * | 2/2014 | Brown | G06F 3/0481 715/853 |
| 2014/0081692 | A1 * | 3/2014 | Bickell | G06Q 10/063118 705/7.17 |
| 2014/0095972 | A1 * | 4/2014 | Molesky | G06F 17/211 715/227 |
| 2014/0281868 | A1 * | 9/2014 | Vogel | G06F 3/04817 715/212 |
| 2014/0282114 | A1 * | 9/2014 | Walkin | H04L 51/32 715/758 |
| 2014/0354650 | A1 * | 12/2014 | Singh | G06T 11/206 345/440 |
| 2014/0380219 | A1 * | 12/2014 | Cartan | G06F 3/04842 715/771 |
| 2015/0026642 | A1 * | 1/2015 | Wilson | G06F 3/0482 715/825 |
| 2015/0046882 | A1 * | 2/2015 | Menyhart | G06F 3/0482 715/854 |
| 2015/0070357 | A1 * | 3/2015 | Tahan | G06F 3/14 345/428 |
| 2015/0143294 | A1 * | 5/2015 | Piccinato | G06F 3/0482 715/817 |
| 2015/0242106 | A1 * | 8/2015 | Penha | G06F 3/04847 715/854 |
| 2015/0324101 | A1 * | 11/2015 | Roesch | G06F 3/04847 715/771 |
| 2015/0346929 | A1 * | 12/2015 | Karunamuni | G06F 3/0483 715/777 |
| 2015/0378529 | A1 * | 12/2015 | Ramanathan | G06T 11/206 715/834 |
| 2016/0210001 | A1 * | 7/2016 | Antipa | G06F 3/0482 |
| 2016/0259517 | A1 * | 9/2016 | Butcher | G06F 3/0482 |

OTHER PUBLICATIONS ict.business.it—"Work via the mobile: it is now more solid with Oracle"; obtained at http://www.ictbusiness.it/cont/news/lavoro-via-mobile-ora-e-piu-solido-con-oracle/30917/1.html#.

(56) References Cited

OTHER PUBLICATIONS

VS2DuPnF8qW; translated to English by Google translator; Jun. 3, 2013; 3 pages.

\* cited by examiner

ORBIT VISUALIZATION ANIMATION

CROSS REFERENCES TO RELATED APPLICATIONS

This application claims priority from the following Provisional Patent Applications, each of which is hereby incorporated by reference as if set forth in full in this application for all purposes:

1. U.S. Provisional Patent Application Ser. No. 62/017,214, entitled METHODS FOR NAVIGATING HIERARCHICAL DATA ON MOBILE DEVICES, filed on Jun. 25, 2014; and 2. U.S. Provisional Patent Application Ser. No. 62/053,638, entitled PETAL ANIMATION FOR TRANSITIONS IN HIERARCHY VISUALIZATIONS, filed on Sep. 22, 2014.

This application is related to the following U.S. Patent Applications, each of which is hereby incorporated by reference as if set forth in full in this application for all purposes:

3. U.S. Pat. No. 9/939,991, entitled VISUALIZATIONS FOR NAVIGATING HIERARCHICAL DATA ON MOBILE DEVICES, issued on Apr. 10, 2018;

4. U.S. patent application Ser. No. 14/684,142, entitled ORBIT VISUALIZATION FOR DISPLAYING HIERARCHICAL DATA, filed on Apr. 10, 2015;

5. U.S. patent application Ser. No. 14/684,159, entitled REFERENCE POSITION IN VIEWER FOR HIGHER HIERARCHICAL LEVEL, filed on Apr. 10, 2015;

6. U.S. Pat. No. 10,175,855, entitled INTERACTION IN ORBIT VISUALIZATION, issued on Jan. 8, 2019;

7. U.S. Pat. No. 10,175,853, entitled CHAIN LAYOUT FOR DISPLAYING HIERARCHICAL DATA, issued on Jan. 8, 2019;

8. U.S. Pat. No. 10,175,854, entitled INTERACTION ORBIT VISUALIZATION, issued on Jan. 8, 2019, each of which are hereby incorporated by reference, as if set forth in full in this specification.

9. U.S. Pat. No. 9,021,397, entitled VISUALIZATION AND INTERACTION WITH FINANCIAL DATA USING SUNBURST VISUALIZATION, issued on Apr. 28, 2015;

10. U.S. Pat. No. 9,495,777, entitled VISUAL DATA ANALYSIS FOR LARGE DATASETS, issued on Nov. 15, 2016;

BACKGROUND

The present application relates to software and more specifically to user interface designs and methods for graphically displaying and interacting with data or associated computing objects.

Software and accompanying methods for facilitating information visualization are employed in various demanding applications, including enterprise resource planning, scientific research, digital libraries, data mining, financial data analysis, market studies, manufacturing production control, drug discovery, and so on. Such applications often demand space-efficient illustrative visualizations for clearly illustrating data and accompanying characteristics, patterns, and interrelationships, while preserving context as the user navigates and views the visualizations.

Illustrative visualizations with features for efficiently preserving context during navigation of the visualizations can be particularly important for enterprise applications and small mobile device displays, where navigation of a large dataset with small display can result in lost context, whereby a user forgets or loses track of which part of the overall visualization is currently being displayed after a particular navigation action, e.g., navigation downward in a hierarchy.

Viewing and navigating large datasets via visualizations displayed on relatively large device screens via conventional tree structures or pivot grids, such as via conventional panning, zooming, or scrolling, or jumping to particular nodes can result in loss of context.

SUMMARY

An example method for transitioning a displayed visualization from a first state to a second state includes displaying an orbit visualization characterized by a first state, wherein the orbit visualization includes a parent node and one or more child nodes positioned about a first orbit path that at least partially circumscribes the parent node; receiving a signal from a user mechanism to initiate navigation of the orbit visualization; transitioning display of the parent node and one or more child nodes in accordance with the navigation, by animating movement and repositioning of the parent node and the one or more child nodes on a user interface display screen such that a resulting node positioning characterizes the orbit visualization in a second state corresponding to a navigated-to location.

In a more specific embodiment, the navigation represents a downward navigation of hierarchically related data underlying the orbit visualization. Animating the movement includes animating a separation of one or more petals of a selected node of the orbit visualization from the selected node. The selected node represents a node that is selected via the signal from the user mechanism used to initiate navigation.

Animating the separation of the petals may further include illustrating movement of the one or more petals from an outer edge of the selected node and onto a second orbit path about the selected node. Animating the separation may further include illustrating movement of the one or more petals in combination with movement of the selected node toward a central portion of the orbit visualization.

In another embodiment, the navigation represents an upward navigation of hierarchically related data characterized by the orbit visualization. In this embodiment, the animating movement step includes animating a combining of one or planets (e.g., child nodes of a parent selected node) of a selected node of the orbit visualization with the selected node, such that the one or more planets are shown transitioning to become one or more petals of the selected node. Animating the combining includes moving the selected node and the one or more planets toward a center of the orbit visualization or otherwise toward a center of the selected parent node.

In another embodiment the signal received from a user mechanism or mechanism indicates a selected node and further indicates that the selected node shall be characterized by an isolation mode when the orbit visualization transitions to the second state, such that no nodes that are superior to the selected node are illustrated in the orbit visualization when the orbit visualization is in the second state.

Hence, certain embodiments discussed herein involve animating transitions between displayed hierarchy levels or navigation locations of an orbit visualization. By animating the transitions as discussed herein, navigation context is provided to the users, whereby users may readily view and understand how the updated orbit visualization relates to a previously displayed version of the orbit visualization.

A further understanding of the nature and the advantages of particular embodiments disclosed herein may be realized by reference of the remaining portions of the specification and the attached drawings.

DETAILED DESCRIPTION OF EMBODIMENTS

Figure 1:
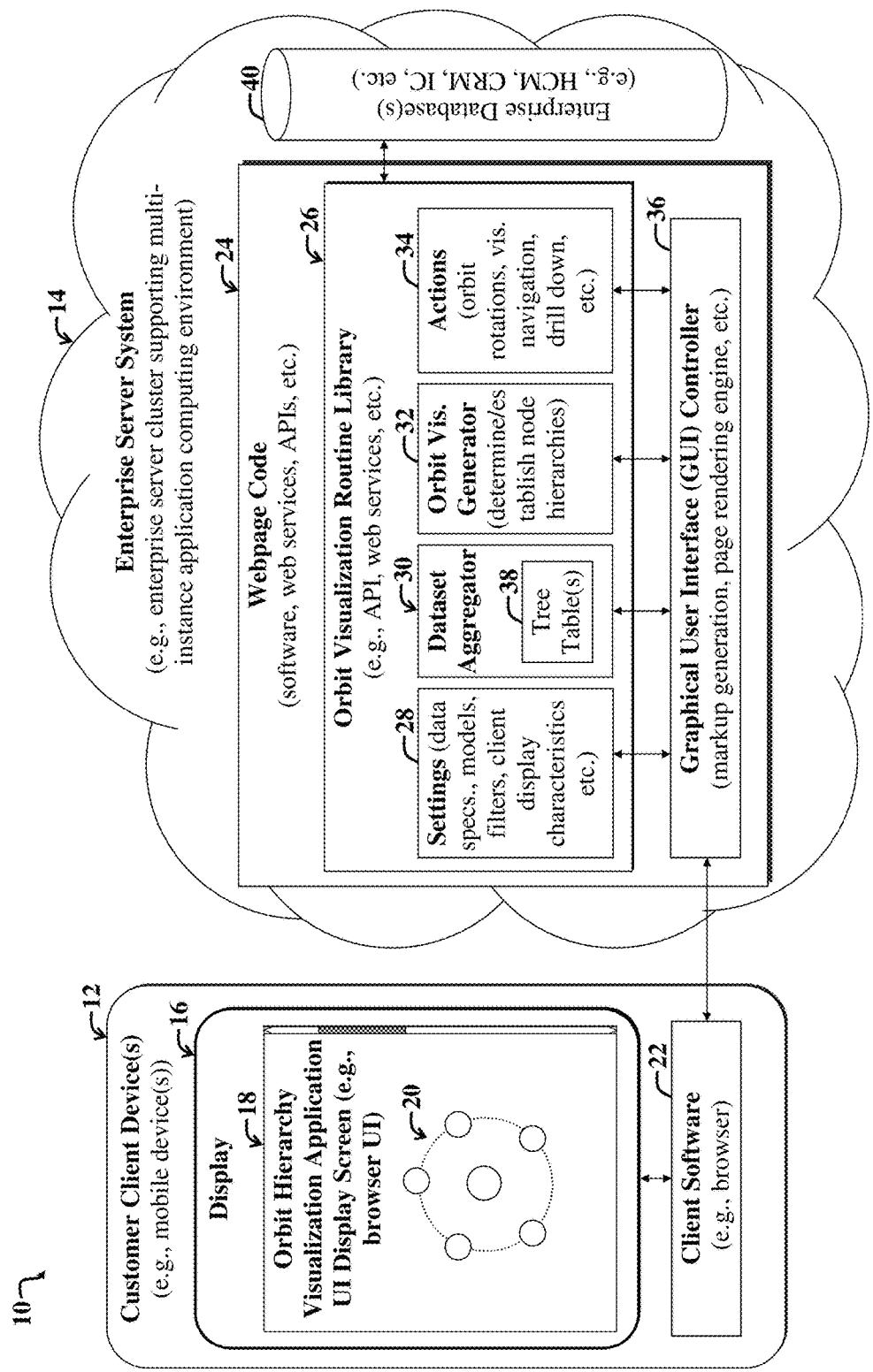
FIG. 1 is a diagram illustrating an example enterprise computing environment and accompanying system for facilitating generating and displaying hierarchical data via orbit visualizations.

For the purposes of the present discussion, information visualization may be any process involving graphically representing data according to a method or scheme. A graphical representation of data resulting from an information visualization technique is called a visualization. Example visualizations include pie charts, treemaps, bar charts, line graphs, N-boxes, maps with data layers, and so on.

An object, such as a data object, may be any grouping of or encapsulation of data and/or functionality. Examples of objects include classes or structures implemented via object-oriented programming languages; tables, rows, columns, fields, or records, of a database; and so on. An object may include a single item or instance of data, such as a number or other descriptor or attribute, or the object may include plural instances of data and/or functionality (e.g., software methods, such as functions or function calls) and may further include sub-objects.

A representation of an object, i.e., a displayed object, may be displayed via a graphical depiction, such as a node of a visualization, a menu item, dialog box, personnel icon, and so on. The graphical depiction of an object may also be called an object, a displayed object, or a node.

The terms "object," "data object," and "computing object" are employed interchangeably herein and may include functionality and/or data. Examples of computing objects include a note, appointment, a particular interaction, a task description, and so on. Examples of data that may be included in an object include text of a note (e.g., a description); subject, participants, time, and date, and so on, of an appointment; type, description, customer name, and so on, of an interaction; subject, due date, opportunity name associated with a task, and so on. An example of functionality that may be associated with or included in an object include issuing a reminder for an appointment, submitting an expense report for approval, approving of an expense report, and so on.

Generally, a node may be any graphical representation of an object in a visualization. Note that certain nodes may include sub-nodes, just as an object may include or represent additional objects, i.e., sub-objects.

For the purposes of the present discussion, a data attribute (also simply called attribute herein) may be any value or property characterizing data. Accordingly, an attribute of a visualization, node, or associated data, may refer to any characteristic of data used to generate a visualization or any characteristic of a visualization representing a characteristic of the data. The data characteristic and/or visualization characteristic may be employed to group or otherwise organize or visually distinguish the data by adjusting features or characteristics of the visualization. Examples of attributes include data dimensions or layers, such as specified by row or column headers of tables used to store the data used for a visualization.

Hence, a node attribute may be any characteristic of a node or any information associated with the node. A node attribute may include a characteristic of underlying data and/or may include a visual attribute.

A visual attribute may be associated with or mapped to an underlying node attribute. For example, a node representing a female employee may include a particular shape (visual attribute) that is associated with the underlying data (e.g., data attribute) indicating that node represents a female.

For the purposes of the present discussion, an enterprise may be any organization of persons, such as a business, university, government, military, and so on. The terms "organization" and "enterprise" are employed interchangeably herein. Personnel of an organization, i.e., enterprise personnel, may include any persons associated with the organization, such as employees, contractors, board members, customer contacts, and so on.

Enterprise software, such as Enterprise Resource Planning (ERP) software, may be any set of computer code that is used by an enterprise or organization. Examples of enterprise software classifications include HCM (Human Capital Management) software, CRM (Customer Relationship Management) software; BI (Business Intelligence) software, and so on. Examples of ERP software applications include Financials, Assets, Procurement, Projects, Supply Chain, and so on. The terms "ERP software" and "ERP application" may be employed interchangeably herein.

Enterprise software applications, such as Customer Relationship Management (CRM), Business Intelligence (BI), and project management software, often include databases with various database objects, also called data objects or entities. For the purposes of the present discussion, a database object may be any computing object maintained by a database. A computing object may be any collection of data and/or functionality. Examples of computing objects include an employee record, a product record, and so on. Examples of data that may be included in an object include employee name and address information, job role, performance ratings, project or task information, appointment records, and so on. An example of functionality that may be associated with or included in an object includes software functions or processes for issuing a reminder for an appointment.

In various embodiments discussed herein, to facilitate conveying information, visual properties of a node can be varied in accordance with a data attribute (also simply called attribute herein) characterizing the underlying object, i.e., data, thereby visually encoding the attribute.

Enterprise data may be any information pertaining to an organization or business, including information about customers, appointments, meetings, opportunities, customer interactions, projects, tasks, resources, orders, enterprise personnel, and so on. Examples of enterprise data include work-related notes, appointment data, customer contact information, descriptions of work orders, asset descriptions, photographs, contact information, calendar information, enterprise hierarchy information (e.g., corporate organizational chart information), and so on.

For the purposes of the present discussion, multi-dimensional data may be any data that can be partitioned by interrelated groupings or categories. A data dimension, often simply called "dimension," may be any category, such as an amount category, used to group or categorize data.

A data level may be any categorization of data of a given dimension. For example, data that includes a location dimension may include different data levels associated with state, county, city, and so on. Such data levels may represent an explicit sub-hierarchy of an implicit hierarchy that includes the location dimension. In general, explicit hierarchies include various data levels, while implicit hierarchies may include several dimensions that may include different data levels.

Enterprise data is often characterized by a hierarchy. For the purposes of the present discussion, a hierarchy may be any arrangement of items, e.g., data objects, names, values, categories, and so on. The items may be ordered or positioned such that they exhibit superior or subordinate relationships with related items in a data set. A hierarchy may refer to a displayed representation of data items or may refer to data and accompanying relationships existing irrespective of the representation.

Data hierarchies may be categorized as explicit and/or implicit hierarchies. Explicit hierarchical representations of data are organized according to hierarchical relationships inherent within the data. Such hierarchical relationships are often based on persistent data attributes characterizing the data. An example of an explicit hierarchy includes information about cities arranged by country, state, county, and so on. Another example may be a human resources hierarchy, which depicts a corporate structure, where employees are subordinate to project managers, which are subordinate to regional directors, and so on. In general, explicit hierarchies are defined and maintained irrespective of the visualization technique used to display the data.

For the purposes of the present discussion, an implicit hierarchical representation, i.e., implicit hierarchy, may refer to an organization of data and relationships that is user instantiated by choices made to display and/or analyze the data. Hence, certain implicit hierarchies may be implied from the way that users classify and summarize detailed amounts or metrics by different data dimensions on reports and analytics. Each level of an implicit hierarchy may correspond to a data dimension displayed in a report or analytic. A data dimension may be any category or classification of an amount or category. For example, columns of a table may represent data dimensions.

In certain embodiments discussed herein, trees (also called tree structures herein) that define a hierarchical structure characterizing data can be created by a human user such as an administrator. Underlying trees may be employed by software to construct orbit visualizations, as discussed more fully below.

Different utilities may be provided, such as TreeManager® in the PeopleSoft® suite of software products, which can allow a user to define trees or other hierarchies. Once defined, the tree can be applied to data to allow viewing of the data in accordance with the tree hierarchy. For example, spending accounts for each department in a large company can be organized via an orbit visualization according to the tree structure of the departments within the organization.

In general, hierarchical relationships characterizing hierarchical data may be "immediate", i.e. where the hierarchical levels of two data objects differ by one (1). In such a case, the data object with the higher hierarchical level may be called the "parent" or "immediate ancestor" or "inferior object" and the data object with the lower hierarchical level may be called the "child," or "immediate descendant," the "inferior object," "subordinate object." Depending upon the context, in an orbit visualization, a node representing a child object of a parent object is called a planet of a node representing the parent object.

Hierarchical relations may be "remote", i.e. where the hierarchical levels of two data objects differ by two (2) or more. In such a case, the data object (or corresponding node) with the higher hierarchical level may be called the "remote ancestor" (such as a "grandparent") and the data object (or associated node) characterized by the lower hierarchical level may be called the "remote descendant" (such as a "grandchild"). Data objects or nodes on the same hierarchical level may be called "hierarchical peers" or "siblings."

For clarity, certain well-known components, such as hard drives, processors, operating systems, power supplies, Internet Service Providers (ISPs), class loaders, bytecode compliers, middleware, and so on, are not necessarily explicitly called out in the figures. However, those skilled in the art with access to the present teachings will know which components to implement and how to implement them to meet the needs of a given implementation.

FIG. 1 is a diagram illustrating an example enterprise computing environment and accompanying system 10 for facilitating generating and displaying hierarchical data via one or more orbit visualizations 20.

Note that, in general, groupings of various modules of the system 10 are illustrative and may vary, e.g., certain modules may be combined with other modules or implemented inside of other modules, or the modules may otherwise be distributed differently (than shown) among a network or within one or more computing devices, without departing from the scope of the present teachings. For example, a system for generating orbit visualizations given a data set may be implemented entirely client-side, e.g., on a mobile device 12, without departing from the scope of the present teachings.

The example system 10 includes the mobile device 12, also called the client device (or simply client) herein, in communication with an enterprise server system 14, which comprises or more servers in communication with the mobile device 12 via a network, such as the Internet.

For the purposes of the present discussion, mobile computing device may be any computer that is adapted for portable use. In general, a computing device may be any computer. A computer may be any processor coupled to memory. Examples of mobile computing devices include laptops, notebook computers, smartphones and tablets (e.g., iPhone, iPad, Galaxy Tab, Windows Mobile smartphones, Windows 7 smartphones and tablets, Android smartphones tablets, Blackberry smartphones, and so on), and so on. Various specific example embodiments discussed herein may employ a mobile computing device further equipped with various features, such as a camera, a network connection, Global Positioning System (GPS) receiver, gyroscope, compass, and user input functionality, such as a touch screen and/or or qwerty keypad. The terms "mobile device" and "mobile computing device" are employed interchangeably herein.

A server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A server system may be any collection of one or more servers and accompanying computing resources.

The example mobile device 12 includes a touch screen 16 displaying a browser User Interface (UI) display screen, which includes an orbit hierarchy visualization UI display screen 18, which illustrates an example orbit visualization 20.

For the purposes of the present discussion, a user interface display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

An orbit visualization may be any visualization or graphical representation of data and/or concepts that represents hierarchical relationships between nodes, at least in part by distributing or positioning one or more subordinate nodes (also called child nodes) about a superior node, where the superior node is a parent node of the one or more subordinate nodes, and where the positions of the one or more subordinate nodes are confined to a path or boundary that at least partially circumscribes the parent node. The terms "orbit hierarchy visualization," "orbit hierarchy," and "orbit visualization" are employed interchangeably herein.

Client-side software 22 may include a browser and associated Graphical User Interface (GUI) software adapted to facilitate browsing content provided by the enterprise server system 14, including applications implemented via webpage code 24. The client-side software 22 includes computer instructions for facilitating rendering hierarchical data, i.e., any data characterized by objects or other elements of data and/or functionality which exhibit one or more hierarchical relationships relative to other objects. The hierarchical data may be retrieved from a backend database 40 of the enterprise server system 14.

The example webpage code 24 includes an orbit visualization routine library 26, which may be implemented via one or more Application Programming Interfaces (APIs), web services, and/or other mechanisms. The routine library 26 includes various modules 28-34, which are adapted to facilitate implementing software functionality used to generate rendering instructions for the orbit visualization 20 and for facilitating providing UI controls and other mechanisms for enabling user interaction with the orbit visualization 20, e.g., enabling navigating a hierarchy of underlying data used to generate the orbit visualization; enabling drilling down into data of data object represented by a node of the orbit visualization 20, and so on, as discussed more fully below.

For the purposes of the present discussion, software functionality may be any function, capability, or feature, e.g., stored or arranged data, that is provided via computer code, i.e., software. Generally, software functionality may be accessible via use of a User Interface (UI) and accompanying UI controls and features. Software functionality may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

A UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software.

For the purposes of the present discussion, navigation may refer to a transition of a graphical user interface display from a first display of one or more objects to a second display of one or more objects in response to user selection of an object or control in the first display of one or more objects.

A user is said to navigate data or to navigate a menu if the user selects one or more different displayed objects or items (e.g., navigation link) to activate other objects or items to be displayed. A navigation link may be any UI control adapted to trigger navigation to a node represented by the navigation link. User selection of a navigation link results in display of a navigated-to location. The updating of a UI display screen and/or associated displayed visualization in response to user selection of a navigation link represents implementation of a navigation step.

A navigated-to node may be any node that is prominently displayed in a UI display screen, such that further navigation is not required to view a representation of the node. In certain embodiments discussed herein, navigated-to nodes are illustrated as central nodes of an orbit visualization.

When navigating a hierarchy visualization, a user is said to implement downward navigation if the user navigates to one or more lower levels of the hierarchy, e.g., by navigating to a child node of a parent node. Similarly, upward navigation involves navigation to one or more higher levels of a hierarchy, e.g., by navigating to a parent node of a child node. In various embodiments discussed herein, the navigated-to node becomes the centrally displayed node, i.e., the node that is most prominently featured, e.g., positioned closest to a center or centroid of the associated orbit visualization.

A representation of an object, i.e., a displayed object, may be displayed via graphical depiction, such as a menu item, dialog box, icon, and so on. The graphical depiction of an object may also be called an object, a displayed object, or a node. Data (or corresponding data object) is said to underlie a node of a visualization if the node is used to navigate the data or to otherwise access the data and/or associated functionality.

For the purposes of the present discussion, in an orbit visualization, a central node may be any node that is displayed closest to a center or centroid of a visualization. In general, the central node represents an example of a navigated-to node, which is part of a navigated-to location of a UI framework characterizing a UI of software used to display orbit visualizations.

Various modules 28-34 of the orbit visualization routine library 26 may communicate with the backend database 40 to facilitate selective retrieval of (and/or access to) data and associated data objects for use in generating rendering instructions for displaying orbit visualizations 20 and accompanying nodes, which represent underlying data objects.

The server-side webpage code 24 further includes a GUI controller 36, which is adapted to selectively communicate with one or more modules 28-34 of the orbit visualization routine library 26 and the client-side software 22. The GUI controller 36 may further act as an interfacing mechanism for enabling various modules 28-34 of the orbit visualization routine library 26 to intercommunicate.

Additional computer instructions, i.e., computer code, of the GUI controller 36 are adapted to selectively call functionality provided by one or more of the modules 28-34 as needed to enable data retrieval and implementation of updates to the orbit visualization 20 in response to user interaction therewith.

User interaction with the orbit visualization 20 may include, but is not limited to navigating upward and downward in the hierarchy represented by the orbit visualization 20, implementing drill-down software actions for user-selected nodes, rotating nodes about a path (i.e., orbit path) that circumscribes a parent node, triggering display of actions menus, informative hover layers, and so on, as discussed more fully below.

The example modules 28-34 of the orbit visualization routine library 26 include a settings module 28, a dataset aggregator 30, an orbit visualization generator 32, and an actions module 34.

The settings module 28 is adapted to provide software functionality for enabling users to specify various settings to characterize the orbit visualization 20. Example settings include specifications of the number of hierarchical levels to display at a given time via the orbit visualization 20 of the client-side orbit hierarchy UI display screen 18; which data sets to visualize via the orbit visualization 20, and so on.

In the present example embodiment, certain settings, e.g., settings specifying the number of hierarchical levels to display, may be determined automatically. Automatic determination of such settings may be implemented by computer code running on the settings module 28. The settings module 28 is adapted to communicate with the client device 12 and accompanying software 22 to determine display characteristics, e.g., display size and resolution, device type, processor and memory specifications, and so on.

In general, larger or higher resolution displays may support display of additional hierarchical levels in the orbit visualization 20 at a given time. The exact number of hierarchical levels to display is implementation specific and may vary, without departing from the scope of the present teachings. Furthermore, various settings may be manually and/or automatically, without departing from the scope of the present teachings.

In general, the settings module 28 may include display characteristics detection software code for facilitating detecting display size, resolution, available client-side native plugins, graphics processing resources, and so on. Additional functionality of the display characteristics detection software code may include functionality for detecting a characteristic of a data object represented via a node of the visualization, and then visually encoding the characteristic via the node. Additional functionality may include detecting one or more permissions associated with a user logged into software used to display the visualization, and adjusting one or more available user options based on the one or more permissions. Additional functionality may be implemented via mechanisms for adjusting visual encoding of information via one or more nodes of the visualization in accordance with the one or more permissions.

For the purposes of the present discussion, visual encoding (also simply called encoding or coding herein) of a data attribute may be any process involving representing the data attribute graphically. For example, if a hierarchical position of a node in an enterprise organizational chart is used to adjust a size, shape, color, or position, etc., of the node in a visualization, then the hierarchical position is said to be visually encoded via the node size, shape, color, or position, respectively.

An attribute of a visualization, node, or associated data, may be any characteristic of data used to generate a visualization, where the characteristic may be employed to group or otherwise organize or visually distinguish the data by adjusting features or characteristics of the visualization. Examples of attributes include data dimensions or layers, such as specified by table headers of tables 38 used to store the data used for a visualization.

The dataset aggregator 30 is adapted to selectively retrieve data (e.g., via Structured Query Language statements, web services, and/or other mechanisms) from the backend database 40, e.g., with reference to the settings 28 and any associated data models specified for use in displaying the orbit visualization 20. Retrieved data may be stored in a cache of the dataset aggregator 30, or alternatively, may be maintained at the database 40 and then only retrieved when needed to facilitate generation of the orbit visualization 20.

Hierarchical relationships inherent in data retrieved by the dataset aggregator 30 may be stored as tree tables 38 or pivot grids. Hierarchical relationships represented by the tree tables 38 may be user-specified and may be adjusted, or alternatively, the relationships are predetermined. Predetermined relationships may include, for example, hierarchical relationships characterizing enterprise personnel, as may be conventionally represented via a tree structure representing an organizational chart.

In the present example embodiment, the displayed orbit visualization 20 represents a hierarchy visualization, whose hierarchical relationships may conventionally characterized by a tree structure.

For the purposes of the present discussion, a hierarchy visualization may be any visualization that is adapted to illustrate a hierarchy or hierarchal relationship between data or data objects. As set forth above, a hierarchy may be any ordering of or arrangement of data, where different data in the arrangement may exhibit superior or subordinate relationships with other data.

A hierarchy may refer to a displayed representation of data objects or may refer to data and accompanying relationships existing irrespective of the representation. For example, an enterprise hierarchy, e.g., which may be displayed via an organizational chart (also called org chart) may be any power structure, position structure, or reporting structure characterizing an enterprise.

The orbit visualization generator module 32 includes computer code for generating rendering instructions for rendering the orbit hierarchy visualization application UI display screen 18, including the accompanying orbit visualization 20. The orbit visualization generator module 32 may reference information and/or instructions provided by other modules 28, 30, 34 of the orbit visualization routine library 26 to facilitate generation of the rendering instructions. The rendering instructions may then be processed by the GUI controller 36 and forwarded to the client software 22 for facilitating rendering and display of the orbit hierarchy visualization application UI display screen 18.

The actions module 34 is adapted to facilitate implementation of software actions associated with various UI controls of the displayed orbit hierarchy visualization application UI display screen 18. Note that in general, a visualization may be coupled to or may otherwise include one or more UI controls, which are associated with software functionality, whereby user selection of the UI control triggers execution of a software action.

For the purposes of the present discussion, a software action may be any process or collection of processes or operations implemented via software. Additional examples of processes include updating or editing data in a database, placing a product order, creating an opportunity business object, creating a business contact object, adding a revenue line to a business object, displaying data visualizations or analytics, triggering a sequence of processes, launching an enterprise software application, displaying a dialog box with details and functionality associated with a particular node (e.g., implementing a drill-down), spinning or moving planet nodes about an orbit path around a parent node, and so on.

In various example embodiments discussed herein, the client-side display 16 represents a touch screen. Various UI controls and associated mechanisms are responsive to touch gestures as input.

For the purposes of the present discussion, touch gesture may be any input provided to a touch-sensitive display, i.e., touch screen, by touching the display. A display may be touched with one or more fingers and/or other objects or devices, such as a stylus.

A multi-touch gesture, such as a two-finger swipe, two-finger separation gesture, two-finger pinch gesture, and so on, may be any gesture that involves contacting a touch-sensitive display simultaneously at different positions on the display.

A gesture may include motion across a display or a tap at a predetermined position or any position of the display. Certain touch gestures may include touching the display and moving fingers or other devices in certain patterns across the display or across certain portions of the display to trigger different UI input signals to control the UI display screens and accompanying applications.

Figure 2:
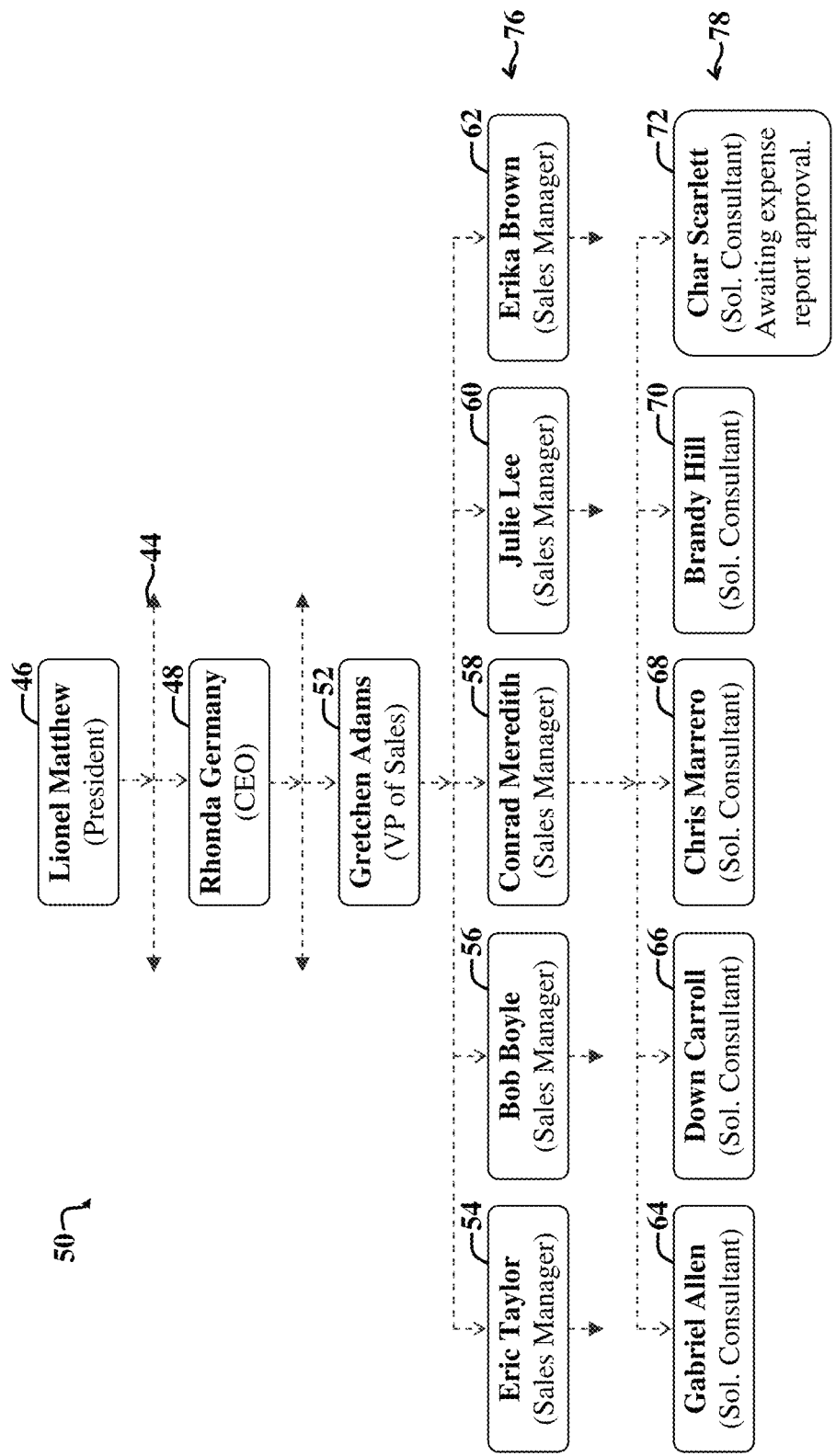
FIG. 2 shows an example tree diagram depicting hierarchical relationships between example data objects, the relationships of which are leveraged by the data aggregator of the system of FIG. 1 to generate orbit visualizations.

FIG. 2 shows an example tree diagram 50 depicting hierarchical relationships (also simply called the hierarchy) between example data objects 46-72. The hierarchical relationships are leveraged by the data aggregator 30 of the system 10 of FIG. 1 to generate orbit visualizations, e.g., the orbit visualization 20 of FIG. 1. The example tree diagram 50 may represent hierarchical relationships of the tree tables 38 of the data aggregator 30.

Note that conventionally, the hierarchical relationships illustrated by the tree diagram 50 may be displayed on a UI display screen as a tree diagram. However, tree diagrams may be relatively cumbersome to use and navigate, especially when used to represent large datasets on relatively small mobile device displays, as conventional panning, zooming, scrolling, and so on, may result in loss of context as the user interacts with the data represented via the tree diagram.

The following discussion of the tree diagram 50 is adapted to facilitate an understanding of various embodiments and associated orbit visualizations, discussed more fully below. The example tree diagram 50 illustrates, at a highest level of the associated hierarchy, a top object 46 (also called a top tier object or a first tier object). A second tier object 48 represents a child object of the top tier object 46. Similarly, a third tier object 52 represents a child object of the second tier object 48.

The third tier object 52 includes various child objects 54-62 at a fourth level (i.e., fourth tier 76) down in the hierarchy 50. An example fourth tier object 58 represents a parent object of its child objects 64-72, which represent fifth tier objects 78. The fifth tier objects 64-72 represent descendant objects of the top tier object 46.

When a user navigates the hierarchy 50 to view lower level objects, the user is said to be navigating downward in the hierarchy. Similarly, if a use navigates a UI display screen to view data of a first child object 54; then to view data of a second child object 56, etc., the user is said to be navigating horizontally in the hierarchy 50.

Figure 3:
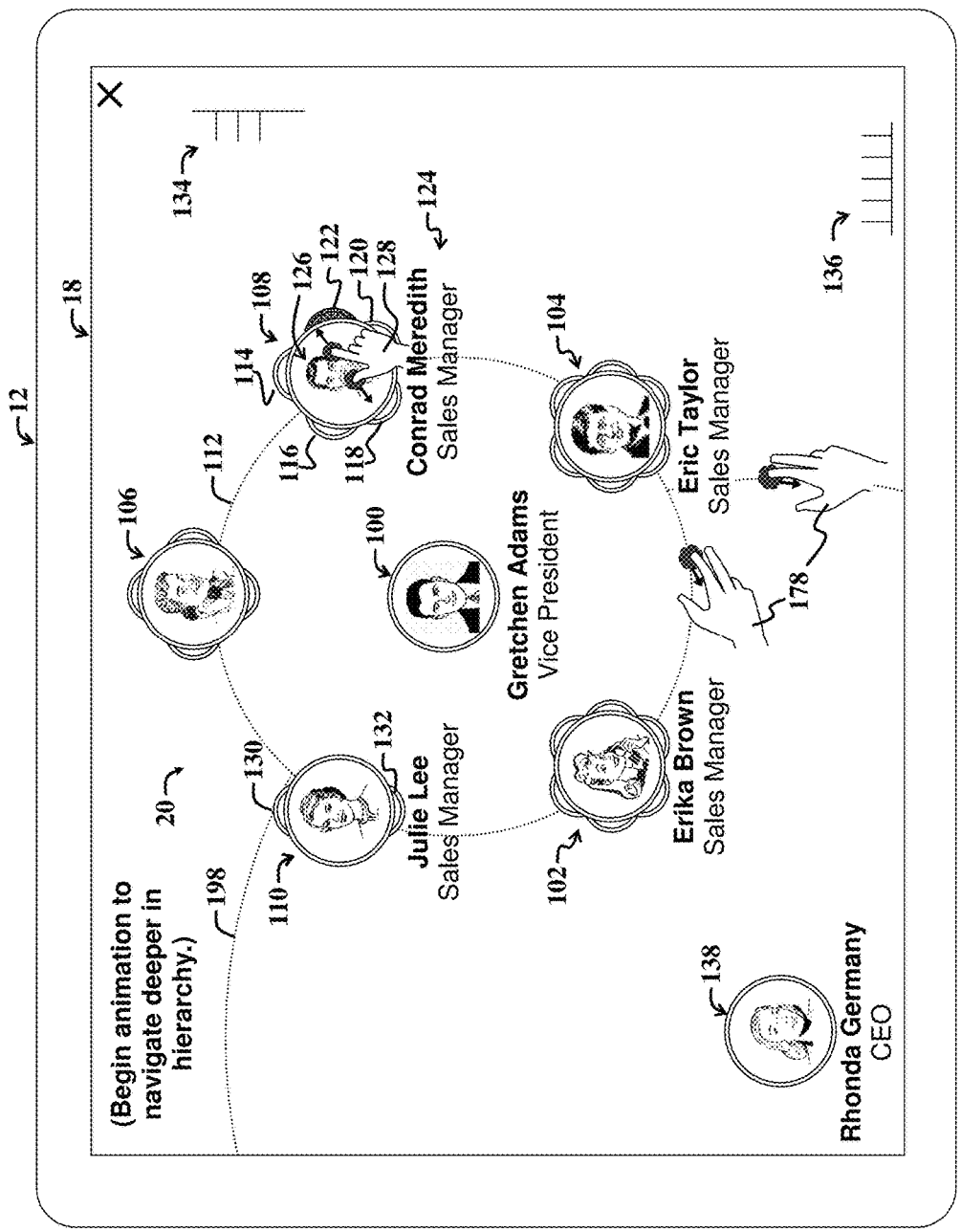
FIG. 3 shows a first example user interface display screen and accompanying orbit visualization reflecting example hierarchical relationships between visualization nodes, where the nodes represent underlying data objects.

FIG. 3 shows a first example UI display screen 18 (which may be implemented via the mobile device display 16 of FIG. 1 or other mechanism, e.g., desktop display) and accompanying orbit visualization 20. The orbit visualization 20 reflects example hierarchical relationships between visualization nodes 100-110, where the nodes 100-110 represent underlying data objects.

With reference to FIGS. 1 and 3, in the present example embodiment, a user has employed the mobile device 12 to browse to a website exhibiting the webpage code 24. The user then logs into the software 24 by providing credentials, e.g., username and password, which are associated with predetermined user access permissions of the user.

A user then interacts with the webpage code 24 via the UI display screen 18 to select an orbit visualization mode. Additional UI controls may facilitate user navigation of the overall orbit hierarchy visualization application UI display screen 18.

The webpage code 24 is activated to retrieve data objects and associated interrelationships as depicted in the tree diagram of FIG. 2, and further illustrated via the orbit visualization 20 of FIG. 3. A central node 100 representing a data object containing information associated with a "Gretchen Adams" enterprise employee is initially shown as the central node 100 of the orbit visualization 20.

Note that initial displays of orbit visualizations as discussed herein may vary, e.g., depending upon visualization settings, data models used, and so on, without departing from the scope of the present teachings.

With reference to FIGS. 2 and 3, the highest level object 46 of FIG. 2 is not represented by a node in the visualization 20, which is limited to showing only three hierarchy levels (if node petals are also considered to represent a hierarchy level) in the present example embodiment. Nevertheless, a higher level node 138, called the "Rhonda Germany" node 138 is shown and corresponds to the second tier object 48 illustrated in FIG. 2. The Rhonda Germany node 138 is a parent node of the central Gretchen Adams node 100 and is located at a reference position at a periphery or corner of the orbit visualization 20. Child nodes 102-110 of the parent Gretchen Adams node 100 correspond to the child objects 54-62 of the third tier object 52 of FIG. 2.

A "Conrad Meredith" node 108 is shown including various petals 114-122. The petals 114-122 correspond to or represent the fifth tier objects 64-72 of FIG. 2. Note that the fifth petal 122 is visually encoded to draw the attention of the logged in user. In the present example embodiment, the fifth petal 122 corresponds to the data object 72 of FIG. 2, and the visual encoding further indicates that an employee associated with the data object 72 is awaiting approval of an expense report (e.g., as shown in FIG. 2).

For the purposes of the present discussion, a petal may be any displayed node or portion thereof that represents a data object, wherein a portion of the node overlaps or is obscured (or appears to overlap or be obscured) by a portion of a parent node about which the petal is positioned.

Note that in certain implementations, petals of a given node may be selectively distributed in different ways as a way to visually encode information. For example, in implementations displaying large nodes with several petals, different petals may be clustered about an outer edge of the large node in accordance with a predetermined grouping criteria, e.g., as may be established by configuring settings. User options for adjusting settings may be accessible via one or more of additional UI controls, e.g., as may be available through a menu activatable via a predetermined touch gesture.

The Gretchen Adams node 100 is movably confined to a first orbit path 198. Similarly, various planets, i.e., child nodes 102-110 of the orbit visualization 20 are movably confined to a second orbit path 112 that circumscribes, i.e., surrounds, the central parent node 100. User options for rotating, spinning, or otherwise repositioning the child nodes 102-110 and/or the Gretchen Adams node 100 may be provided, e.g., by enabling a swipe gesture to trigger movement or orbiting of the child nodes 102-110 about the central node 100 or movement of the Gretchen Adams node 100 about the Rhonda Germany node 138.

The child nodes 102-110 are also called satellite nodes or planets, which when moved about the orbit path 112 are said to orbit the central node 100. The example nodes 100-110 may include various indicia, e.g., indicia 124, indicating a name and title of an enterprise employee associated with a given node, which is in turn associated with an underlying data object.

Each planet (also called planet node) 102-110 may include petals indicative of and/or corresponding to direct reports, i.e., child nodes of the planet. For example, a "Julie Lee" node 110 includes two direct reports associated with petals 130, 132.

For the purposes of the present discussion, a planet may be any node of an orbit visualization that is at least approximately confined to an orbit path or position on an orbit path or boundary. The terms "planet," "planet node," "satellite," "satellite node" are employed interchangeably herein. Petals may represent a particular type of planet, which may be actuated and separated from the boundary of a parent node, e.g., via a two-finger separation gesture 128.

The UI display screen 18 further includes a vertical carousel control 134. The carousel control 134 is configured to indicate a level or navigation location currently being shown by the orbit visualization 20. For example, the carousel control 134 includes three horizontal bars indicating that the currently displayed navigation level corresponds to a third tier view (e.g., third tier object 52 of FIG. 2), which illustrates the third tier Gretchen Adams node 100 as a central node. Alternatively, or in addition, the carousel control 134 features indicate a number of navigation steps that the logged in user has navigated to, where each navigation step may represent or correspond to a navigation breadcrumb, as discussed more fully below.

The carousel control 134 is adapted to provide additional navigation functionality and navigation reference features. For example, a tap and hold gesture applied to the carousel control 134 may activate a user selectable list indicating different navigation locations to which a user may transition the orbit visualization 20.

For the purposes of the present discussion a carousel control may be any mechanism, e.g., UI control and/or widget, that may be scrolled to view elements or links that may be navigated to. A breadcrumb may be any mechanism for marking a history of navigation steps during navigation of a graphical UI of a software application.

For the purposes of the present discussion, a linked breadcrumb may be any user selectable mechanism for indicating a previously visited menu item, UI display screen, or other navigation location, e.g., database object, folder, file, dialog box, and so on, and enabling triggering of subsequent navigation thereto. In the present specific embodiment, a particular displayed representation of a breadcrumb (also simply called a breadcrumb) may act as a hyperlink upon user selection thereof, where the hyperlink triggers display of a UI display screen representative of the name of the breadcrumb.

Hence, the term "breadcrumb" may include data characterizing a UI display screen associated with or indicated via the breadcrumb and/or the displayed representation of the UI control characterizing the breadcrumb, and/or functionality associated with the UI control.

In general, a breadcrumb trail represented in a list that is activatable via the carousel control 134 may indicate a current navigation location and provide mechanisms enabling users to transition to display of previously visited navigation locations, i.e., UI display screens. A carousel control list may be any UI feature that visually indicates one or more breadcrumbs and/or representations of one or more breadcrumbs.

Similarly, a horizontal carousel control 136 provides features for facilitating horizontal navigation to different siblings of the central node 100. The example horizontal carousel control 136 includes five vertical bars corresponding to five siblings of the central Gretchen Adams node 100. A tap and hold gesture applied to the horizontal slider may activate a menu or list with breadcrumbs or other links to facilitate horizontal navigation to sibling nodes of the Gretchen Adams node 100.

Figure 4:
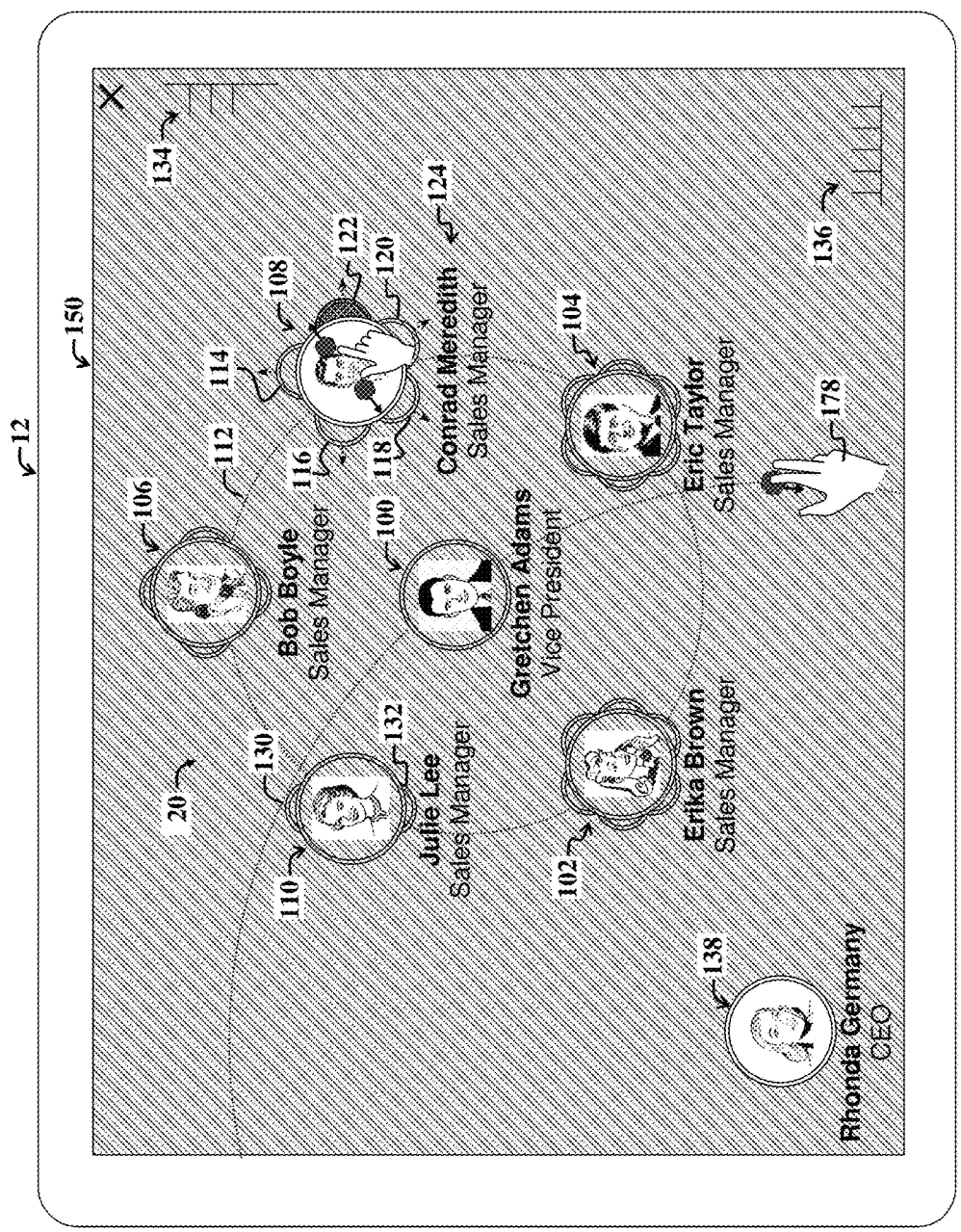
FIG. 4 shows a second example user interface display screen, illustrating a first example state of a navigation animation illustrating navigation downward into underlying hierarchical data in response to user initiation of a downward navigation action.

FIG. 4 shows a second example UI display screen 150, illustrating a first example state of a navigation animation illustrating navigation downward into underlying hierarchical data in response to user initiation of a downward navigation action. In the present example embodiment, a user activates the downward navigation by applying the two finger separation gesture 128 to a selected node, e.g., the Conrad Meredith node 108 of FIG. 3.

During the initial phase of the animation, the petals 114-122 of the selected Conrad Meredith node 108 begin to separate from an outer edge of the Conrad Meredith node 108, i.e., begin move away from a center or centroid of the Conrad Meredith node 108. In addition, the petals 114-122 begin to enlarge or expand as they begin to slowly convert into planets.

The petals 114-122 are said to expand from the Conrad Meredith node 108, i.e., to move radially outward and visually metamorphosize into the five orbiting planets, as discussed more fully below with reference to FIGS. 5-7.

In addition, upon initiation of the downward navigation animation, a background appearance of the UI display screen 150 may change to indicate that the animation has begun.

Figure 5:
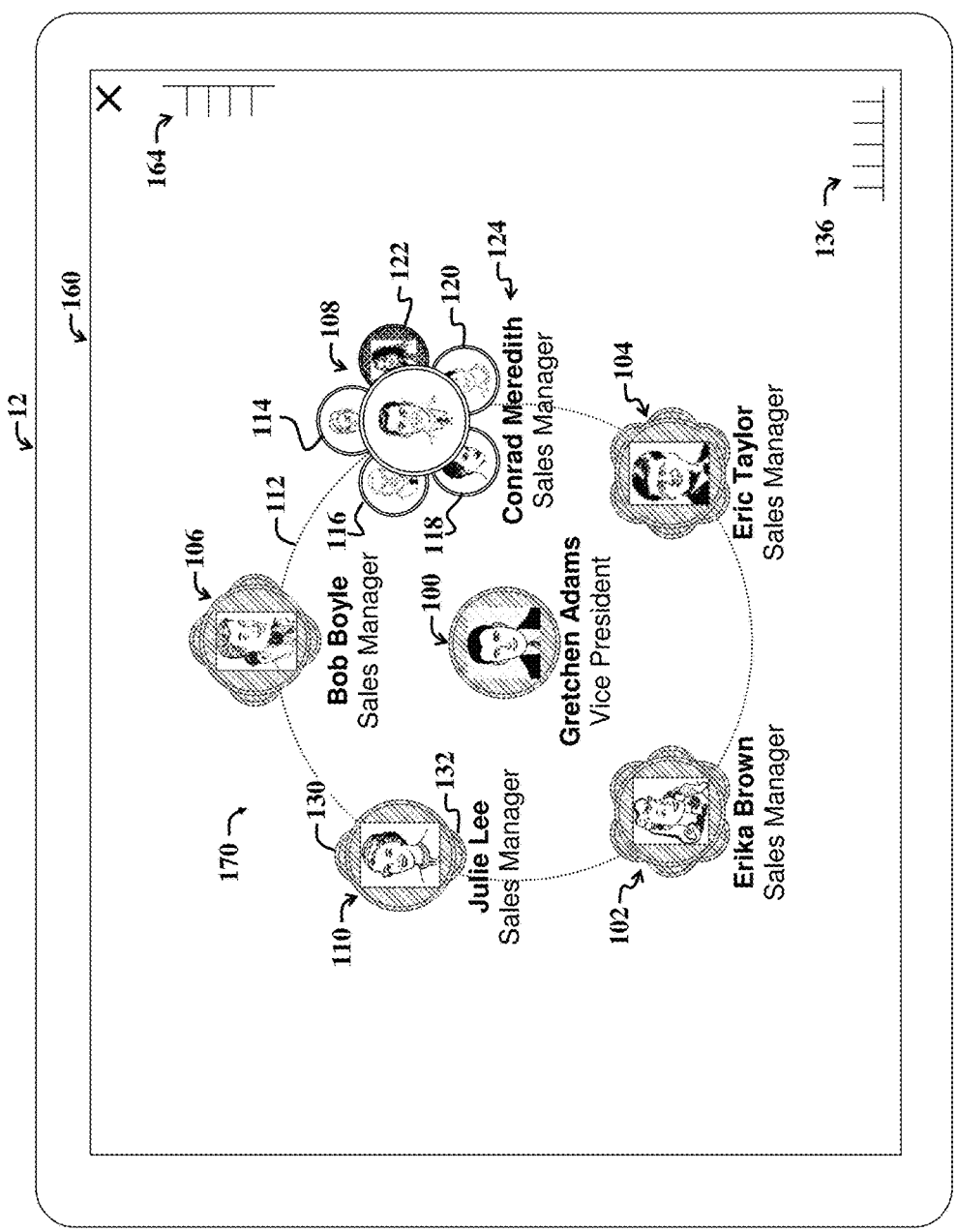
FIG. 5 shows a third example user interface display screen illustrating a second example state of the navigation animation, wherein petals of a selected node are shown expanding from an outer edge of the selected node.

FIG. 5 shows a third example UI display screen 160 illustrating a second example state of the navigation animation initiated in FIGS. 3-4, wherein petals 114-122 of the selected Conrad Meredith node 108 are shown expanding from an outer edge of the selected node 108. The second example state is represented by an updated orbit visualization 170.

Note that at various stages of the animation, background appearance and node appearance may shift. Exact coloring, shading, or other appearance changes appearing at different stages of the animation are implementation specific and may vary in accordance with the needs of a given application, without departing from the scope of the present teachings.

Note that in the second stage or state of the animation, as shown in FIG. 5, the higher level Rhonda Germany node 138 shown in FIG. 4 has been removed from the UI display screen 160 to make way for the Gretchen Adams node 100 to be positioned in place of the Rhonda Germany node 138 of FIG. 4.

Note that the vertical carousel control 134 of FIGS. 3 and 4 is updated, resulting in an updated carousel control 164 illustrating four horizontal bars, indicative of the fact that the Conrad Meredith node 108 that is being positioned as a central node is a fourth tier node (e.g., corresponding to the fourth tier 76 of FIG. 2).

Figure 6:
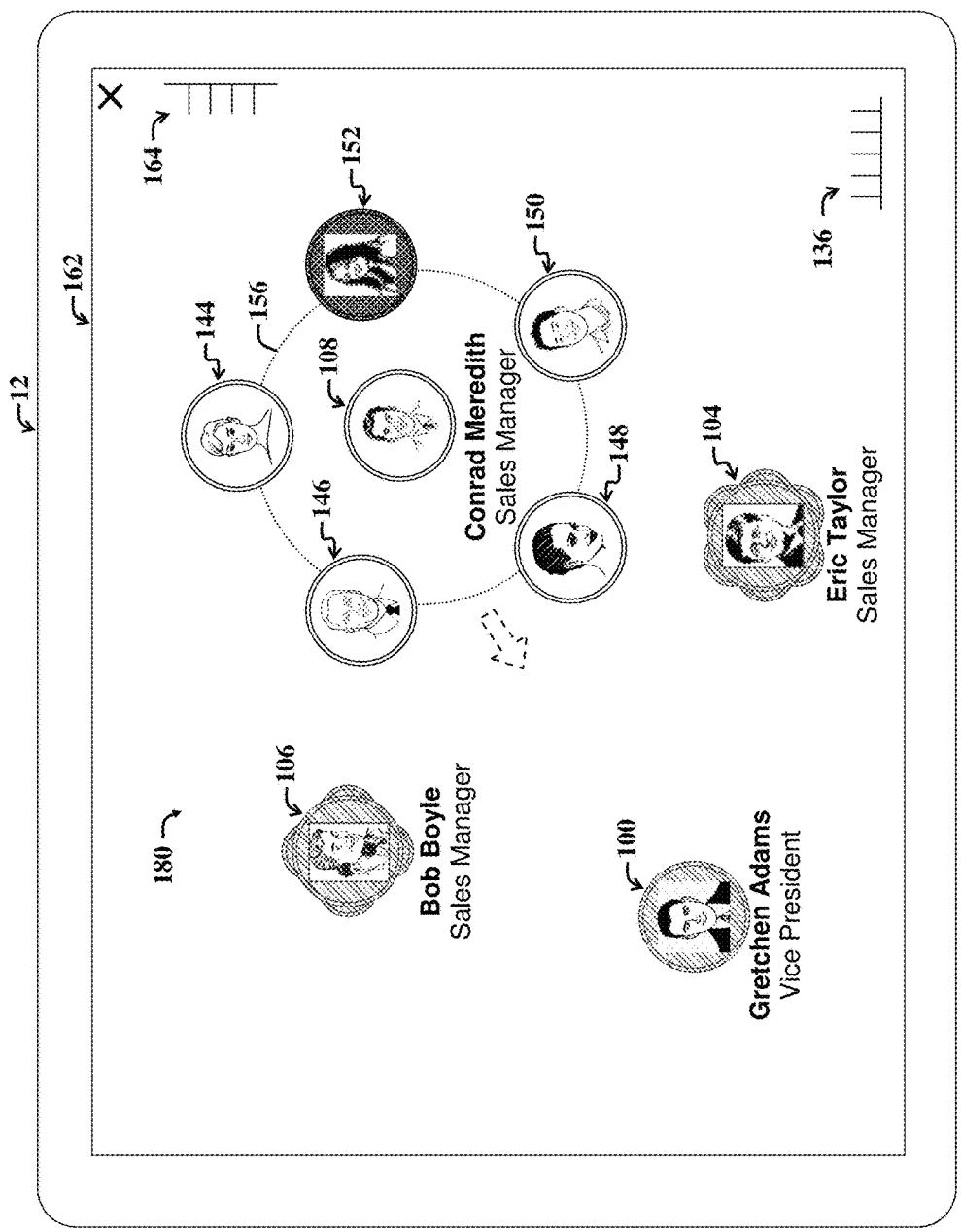
FIG. 6 shows a fourth example user interface display screen illustrating a third example state of the navigation animation, wherein petals of the navigated-to node, i.e., selected node, have separated from an outer edge of the selected node, and other nodes have transitioned off of the user interface display screen.

FIG. 6 shows a fourth example UI display screen 162 illustrating a third example state (corresponding to the updated visualization 180) of the navigation animation, wherein former petals 114-122 of the navigated-to node, i.e., selected Conrad Meredith node 108, have separated from an outer edge of the selected node to become respective planets 144-152, and other nodes 102, 110, 138 of FIG. 4 have transitioned off of the updated fourth example UI display screen 162.

Simultaneously, the selected Conrad Meredith node 108 and accompanying planets or satellites 144-152 begin to move toward a central portion of the UI display screen 162, as the Conrad Meredith node 108 transitions to a central node position (corresponding to a navigated-to location) of the orbit visualization 180.

Figure 7:
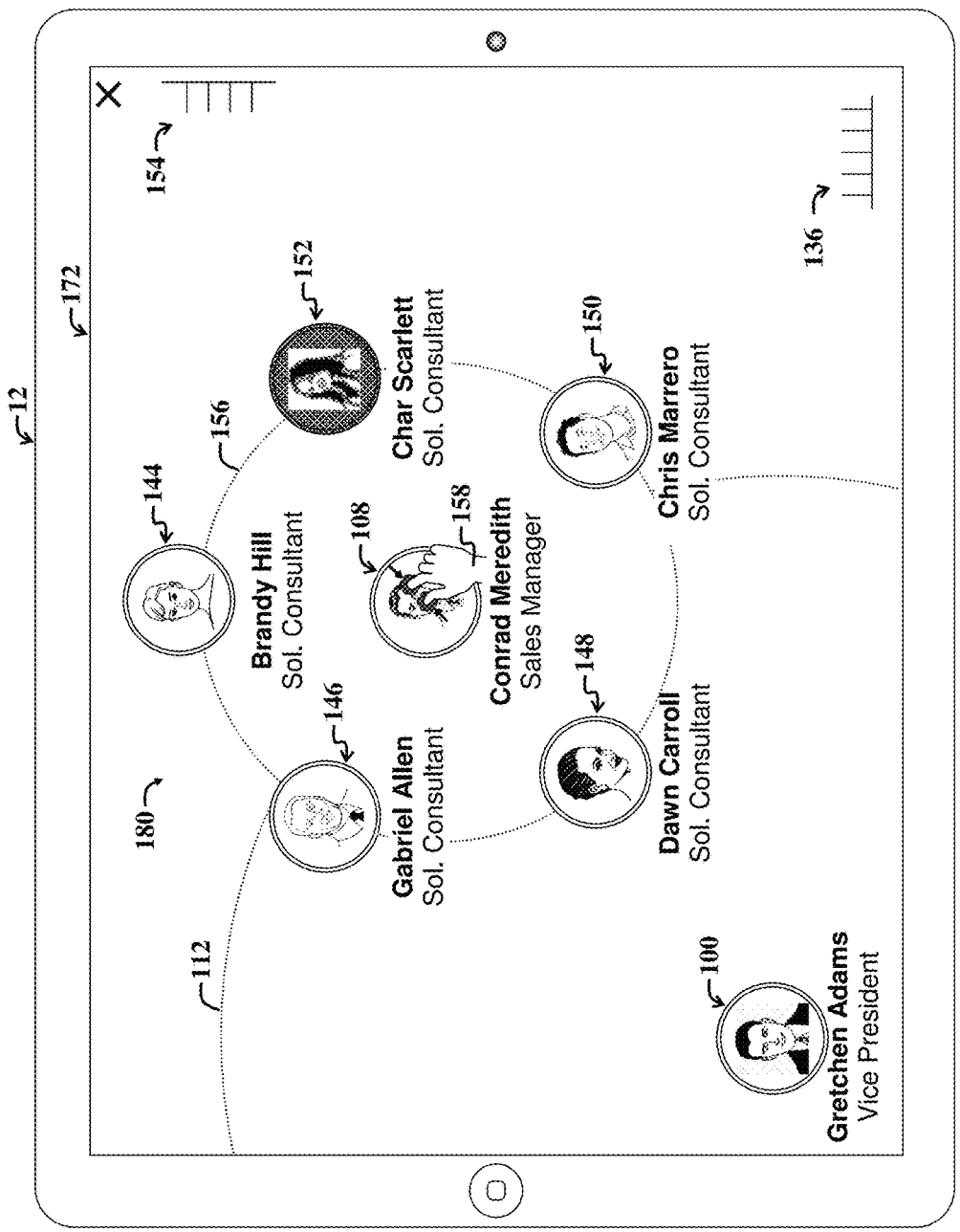
FIG. 7 shows a fifth example user interface display screen illustrating a fourth example state (i.e., end state) of the navigation animation, wherein the navigated-to node selected in the user interface display screen of FIG. 4 has become the central node of the orbit visualization.

FIG. 7 shows a fifth example UI display screen 172 illustrating a fourth example state (i.e., end state corresponding to the updated visualization 180) of the navigation animation, wherein the navigated-to node 108 selected in the UI display screens 18, 150 of FIGS. 3 and 4 has become the central node of the updated orbit visualization 180. The updated visualization 180 represents a navigated-to location within the UI display screen 172.

To return the displayed visualization 180 to the previous state shown as the orbit visualization 20 of FIG. 3, a user may apply a pinch gesture 158 to the central Conrad Meredith node 108. The pinch gesture is said to trigger upward navigation back to the orbit visualization 20 of FIG. 3. The transitioning of the visualization 180 back to the orbit visualization 20 of FIG. 3 may be animated, where the animation follows the example steps of the animation depicted in FIGS. 3-7 in reverse order.

Figure 8:
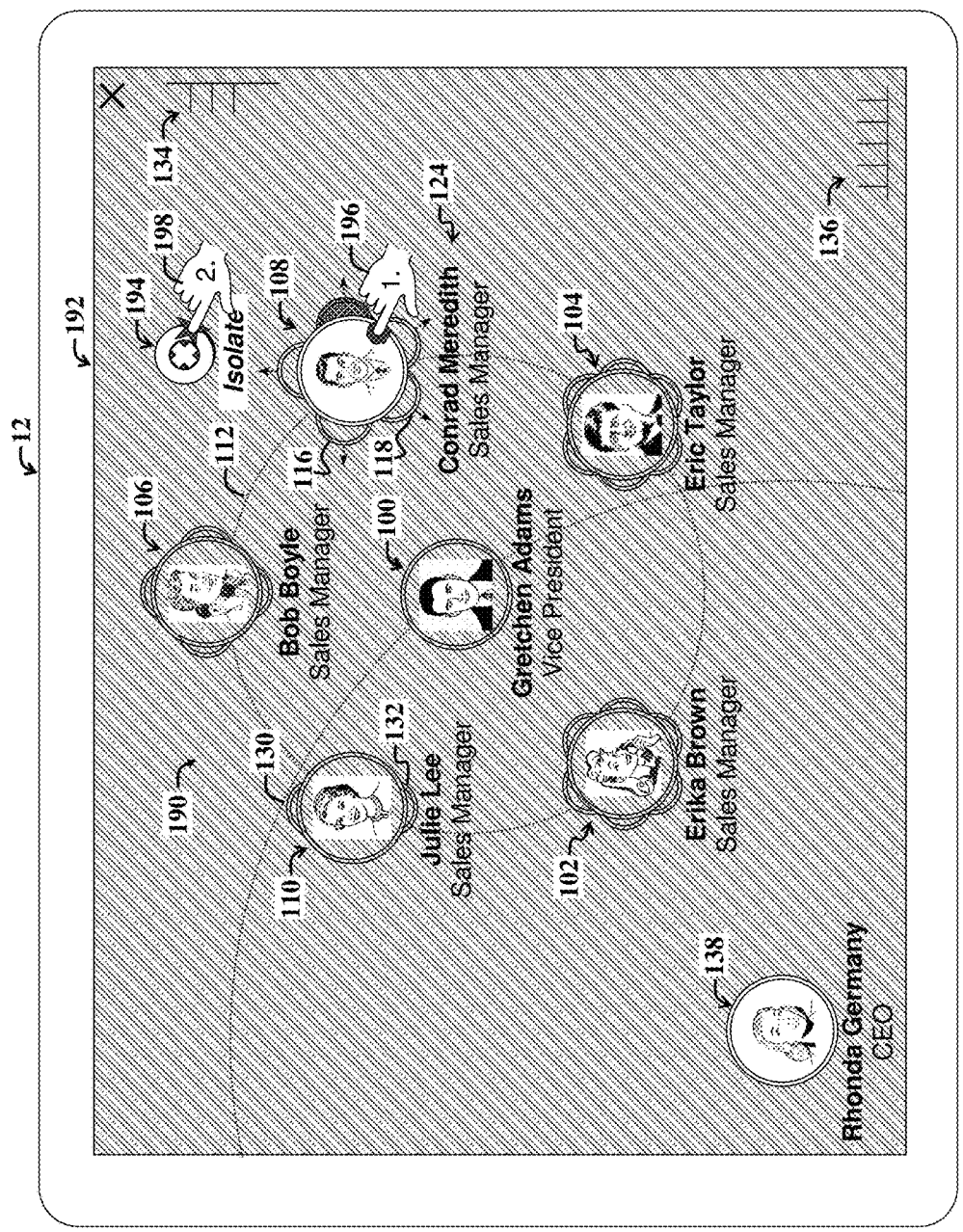
FIG. 8 shows a sixth example user interface display screen illustrating user selection of an option to isolate a node, thereby triggering an animation of the orbit visualization to a state characterized by the selected isolated node as the central node of the orbit visualization.

FIG. 8 shows a sixth example UI display screen 192 illustrating user selection of an option 194 to isolate a node from an example orbit visualization 190, thereby triggering an animation of an associated orbit visualization 190 to a state characterized by the selected isolated node 108 as the central node of the orbit visualization.

Isolation of the Conrad Meredith node 108 results in higher level nodes, i.e., nodes associated with higher hierarchical levels than the Conrad Meredith node 108 are removed from the resulting visualization after isolation, as discussed more fully below. An option to trigger an isolation mode, as discussed herein may be particularly useful when employing orbit visualizations and associated embodiments to illustrate and enable user interaction with large data sets, which may include many nodes, e.g., hundreds or thousands.

In the present example embodiment, a user has first selected the Conrad Meredith node 108, e.g., by a tap and hold gesture 196, which then activates a contextual menu from which the user can select, e.g., via a tap gesture 198, an isolation control 194.

In example embodiments discussed herein, transition of a node into an isolation state, i.e., "isolation mode," is animated approximately similarly to animations for transitioning during navigating upward or downward, as discussed more fully below with reference to FIGS. 9-12.

Figure 9:
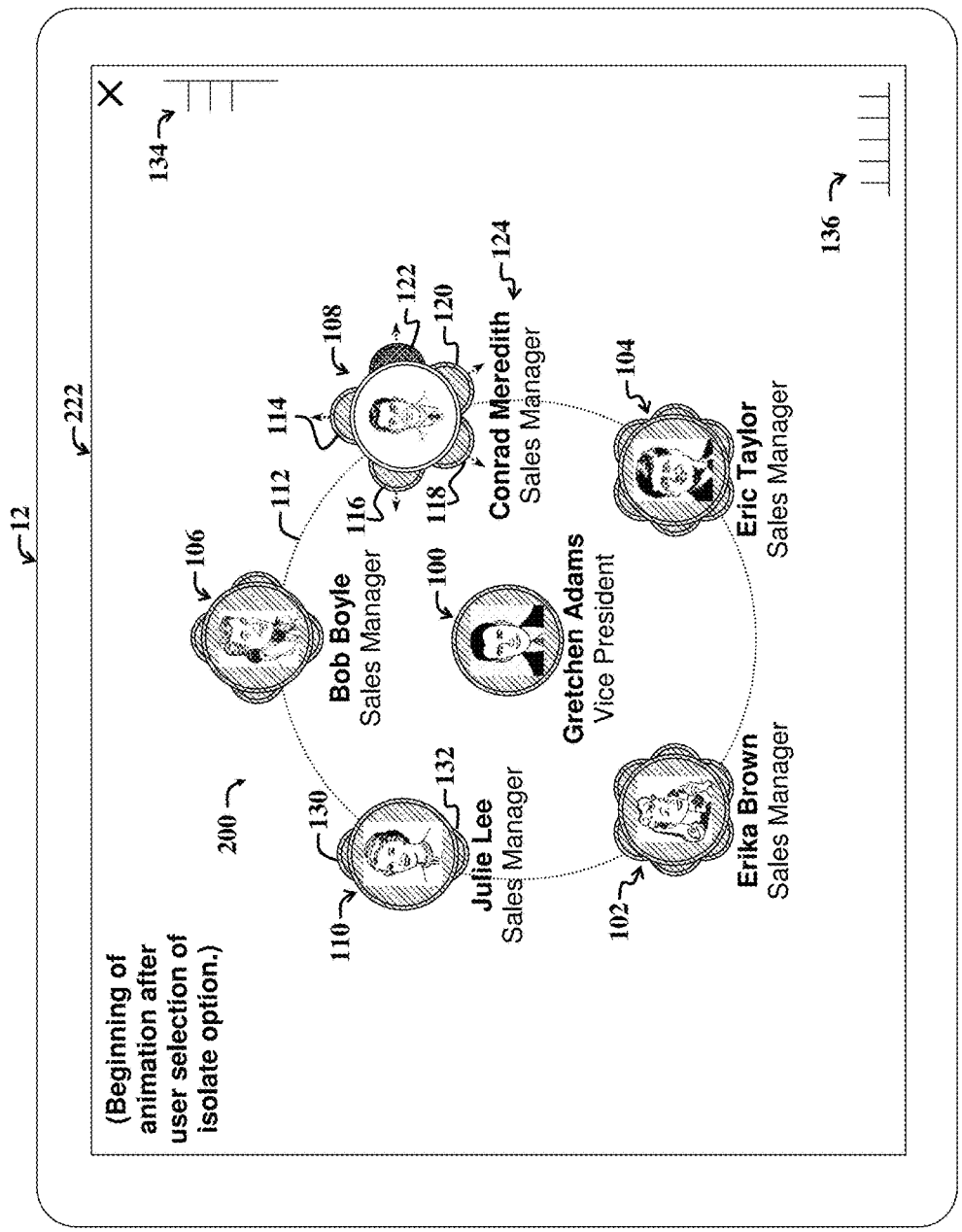
FIG. 9 shows a seventh example user interface display screen, illustrating a first example state of a second navigation animation illustrating navigation downward into underlying hierarchical data in response to user initiation of an isolate action in response to user selection of the isolate option from the user interface display screen of FIG. 8.

FIG. 9 shows a seventh example UI display screen 222, illustrating a first example state (represented by an updated orbit visualization 200) of a second navigation animation illustrating navigation downward into underlying hierarchical data in response to user initiation of an isolate action in response to user selection of the isolate option from the UI display screen of FIG. 8.

Figure 10:
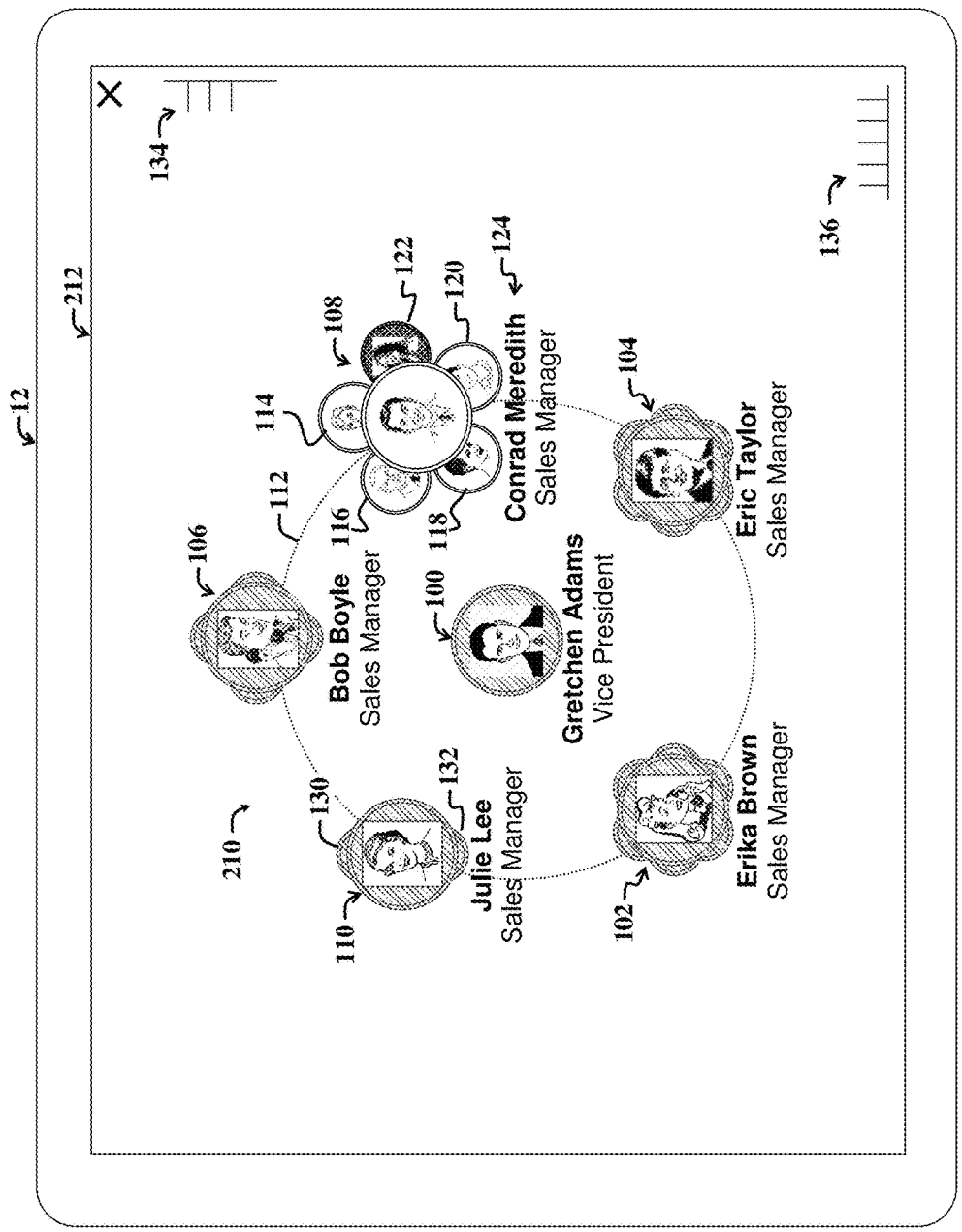
FIG. 10 shows an eighth example user interface display screen illustrating a second example state of the second navigation animation, wherein petals of a selected node are shown expanding from an outer edge of the selected node.

FIG. 10 shows an eighth example UI display screen 212 illustrating a second example state (characterized by an updated orbit visualization 210) of the second navigation animation (represented in FIGS. 8-12), wherein petals 114-122 of the selected node 108 are shown expanding from an outer edge of the selected node 108.

In the updated orbit visualization 210, the visual appearance of various nodes 100-110 may change to indicate that an animation is ongoing. In the updated orbit visualization 200, the higher level Rhonda Germany node (138 of FIG. 8) has been removed to make way for replacement by the currently central Gretchen Adams node 100. The location of the Gretchen Adams node 100 is changed to make way for replacement by the Conrad Meredith node 108, as discussed more fully below with reference to FIGS. 11-12.

Figure 11:
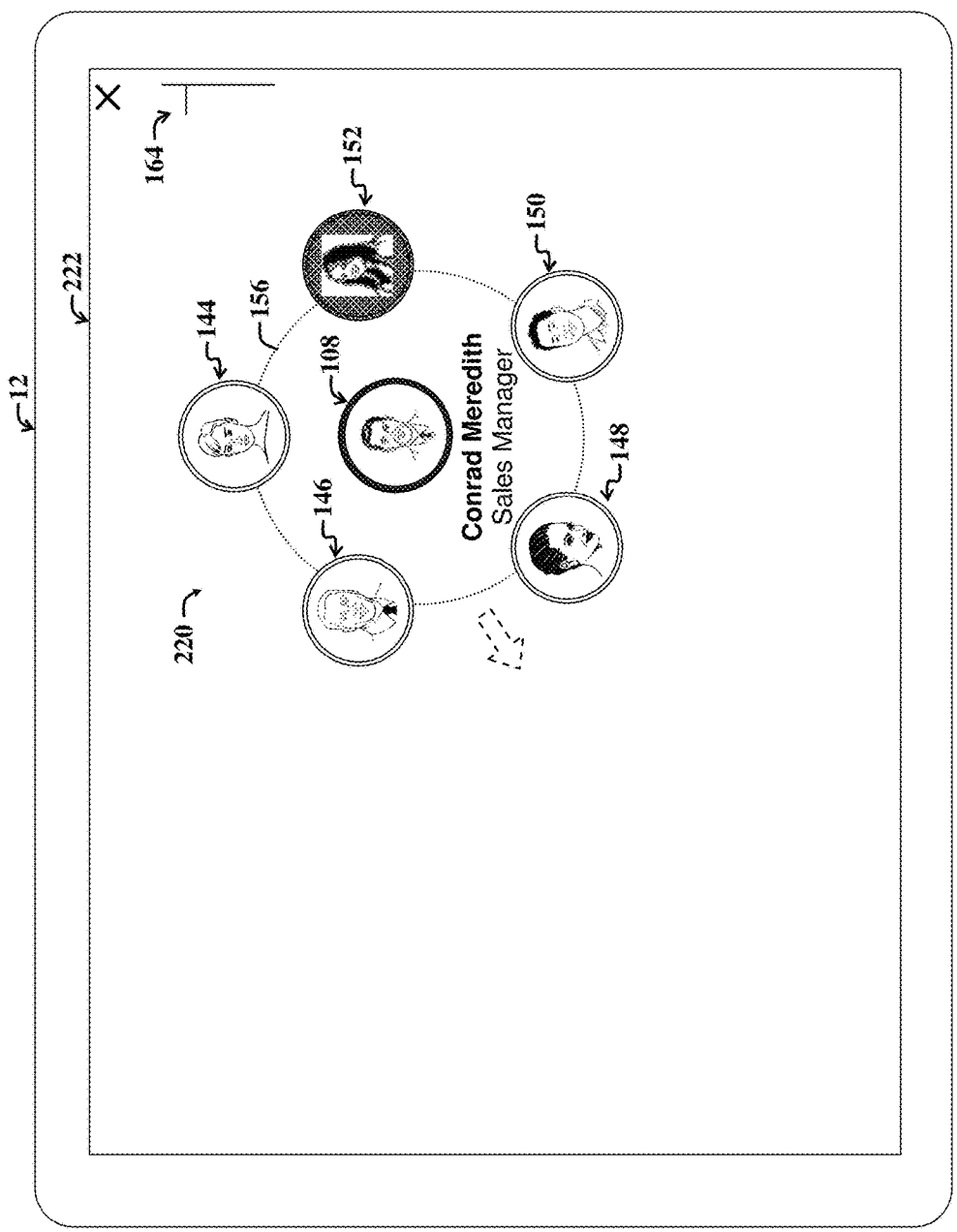
FIG. 11 shows a ninth example user interface display screen illustrating a third example state of the second navigation animation, wherein petals of the navigated-to node, i.e., selected node, have separated from an outer edge of the selected node, and other nodes have transitioned off of the user interface display screen.

FIG. 11 shows a ninth example UI display screen 222 illustrating a third example state (represented by an updated orbit visualization 220) of the second navigation animation, wherein petals 114-122 (shown in FIG. 10) of the navigated-to node, i.e., selected node 108, have separated from an outer edge of the selected node 108 and have become respective planets 144-152, and other nodes have transitioned off of the UI display screen 222.

Note that the vertical carousel control 134 of FIG. 10 has been updated (and appears as an updated carousel control 164) to illustrate that the selected Conrad Meredith node 108 represents a top tier node when the visualization 220 enters isolation mode, since when a node is isolated, ancestor nodes are selectively removed from the hierarchy and only restored when isolation mode is exited. Also, note that in FIG. 11, the updated orbit visualization 220 is in motion toward a central portion of the UI display screen 222.

Figure 12:
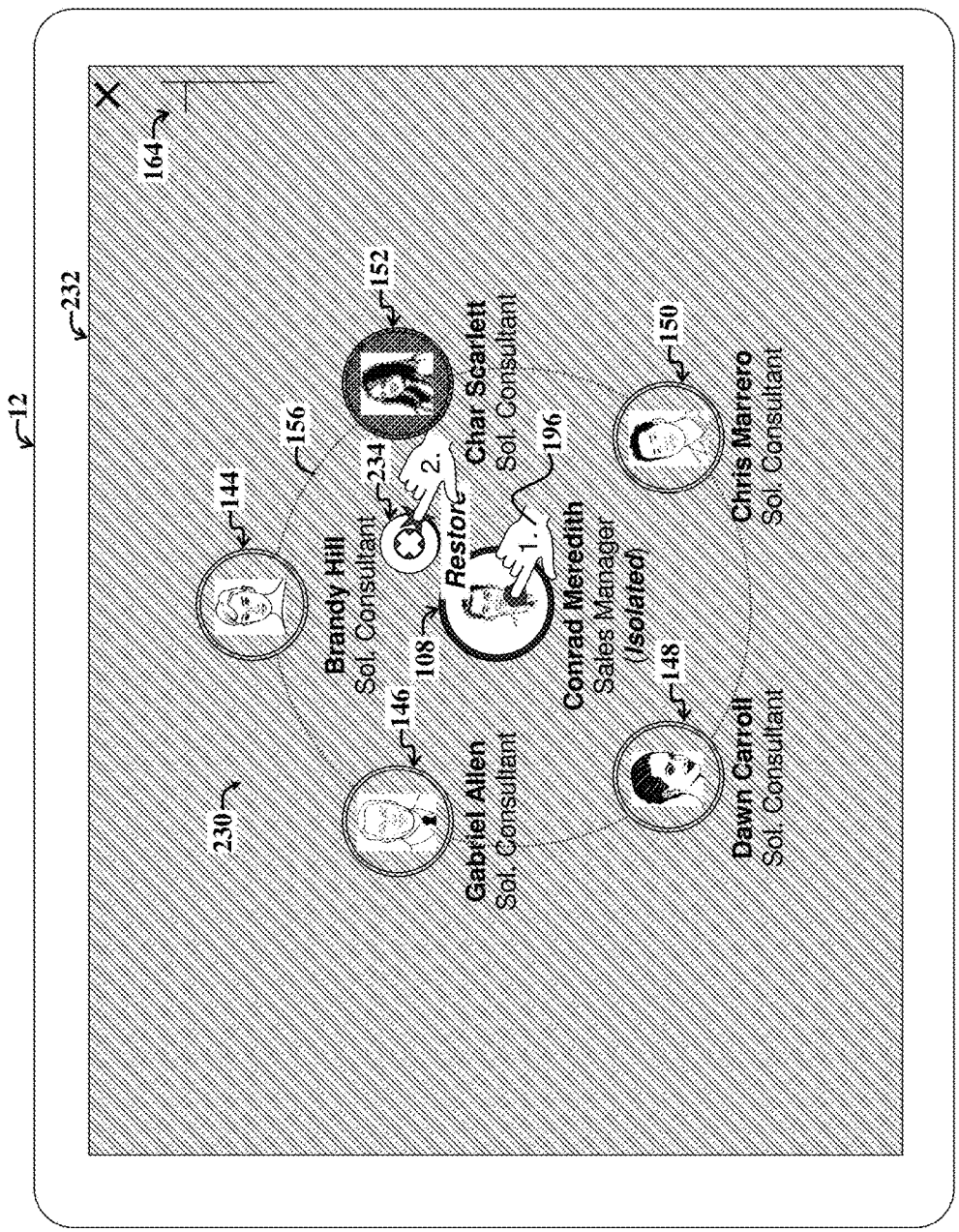
FIG. 12 shows a tenth example user interface display screen illustrating a fourth example state (i.e., end state) of the second navigation animation, wherein the navigated-to node selected in the user interface display screen of FIG. 9 has become the central node of the orbit visualization, and higher-level nodes (also called ancestor nodes of the selected node) have been removed.

FIG. 12 shows a tenth example UI display screen 232 illustrating a fourth example state (i.e., end state represented by an updated visualization 230) of the second navigation animation, wherein the navigated-to node 108 selected in the UI display screen of FIG. 9 has become the central node of the updated orbit visualization 230, and higher-level nodes (also called ancestor nodes of the selected node) have been removed in accordance with the isolation mode applied to the Conrad Meredith node 108 and associated visualization 230.

Figure 13:
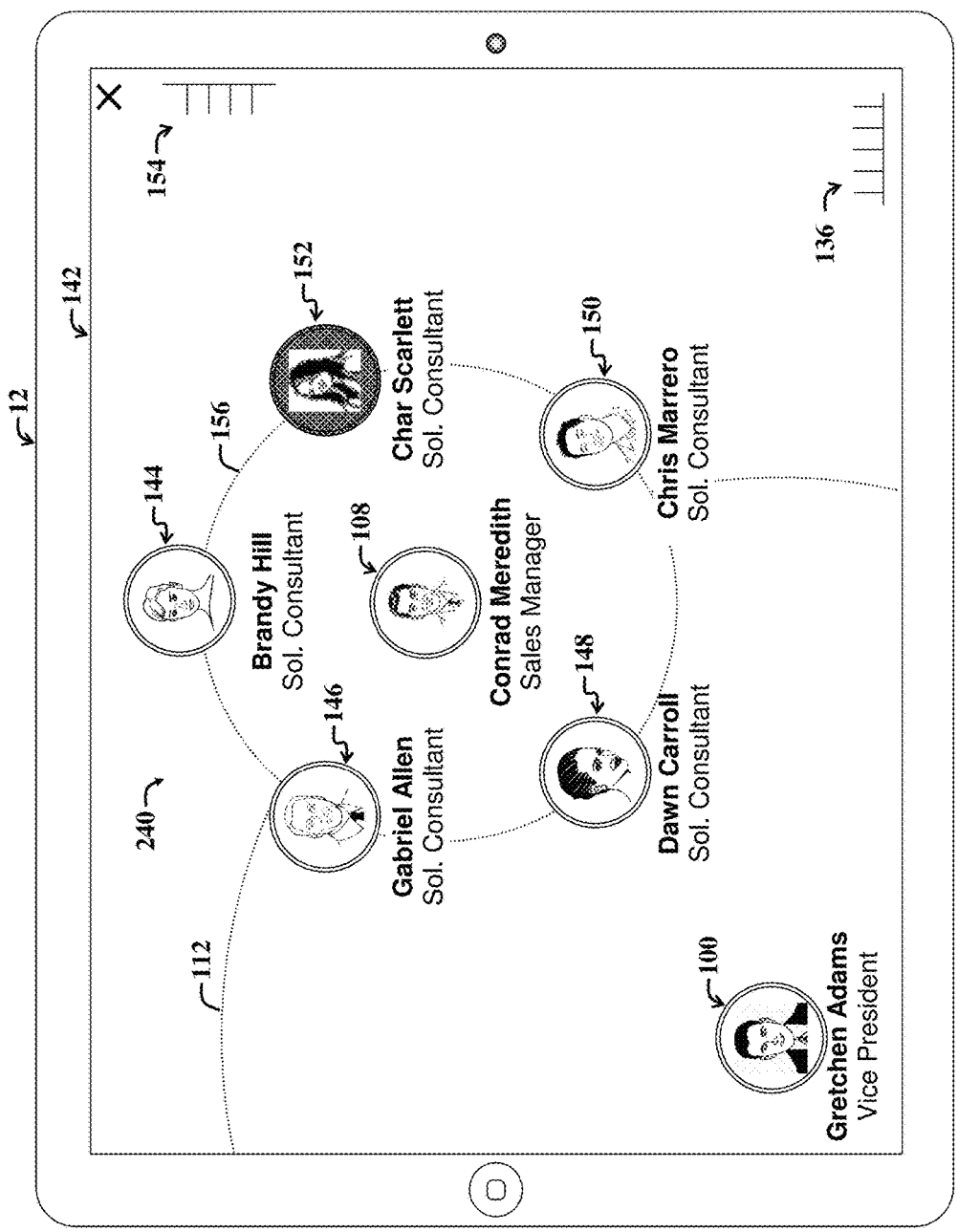
FIG. 13 shows an eleventh example user interface display screen after user selection of an option to remove isolation mode, i.e., to remove the isolation mode associated with the selected node, and further illustrating restoration of a representation of a parent node of the selected node.

Also shown in FIG. 12, a user has applied a tap and hold gesture 196 to the Conrad Meredith node 108 to activate a restore control 234, which may be selected to trigger removal of the isolation mode, such that the parent node 100 of Conrad Meredith 108 appears, e.g., as shown in FIG. 13. Also note that an updated vertical carousel control 164 indicates one horizontal bar, indicating that the isolated Conrad Meredith node 108 now represents a top level node after isolation, as during isolation mode, ancestors are removed from the underlying hierarchy. When isolation mode is canceled, the vertical carousel control 164 resets to show four horizontal bars, as ancestors of the Conrad Meredith node 108 are then restored, and the Conrad Meredith node 108 then represents a fourth tier node. Also note that the seventh example UI display screen 232 lacks a horizontal carousel control for accessing sibling nodes of the Conrad Meredith node 108, as during the present example isolation mode, both ancestor nodes and sibling nodes are removed from the underlying hierarchy and associated visualization 230, and only restored when isolation mode is canceled, i.e., the original mode is restored, e.g., by selection of the restore control 234.

FIG. 13 shows an eleventh example UI display screen 142 after user selection of an option (234 of FIG. 12) to remove isolation mode, i.e., to remove the isolation mode associated with the selected node 108, and further illustrating restoration of a representation of a parent node of the selected node in accordance with the removal of the isolation mode from the selected node 108 and associated orbit visualization 230 of FIG. 12.

Figure 14:
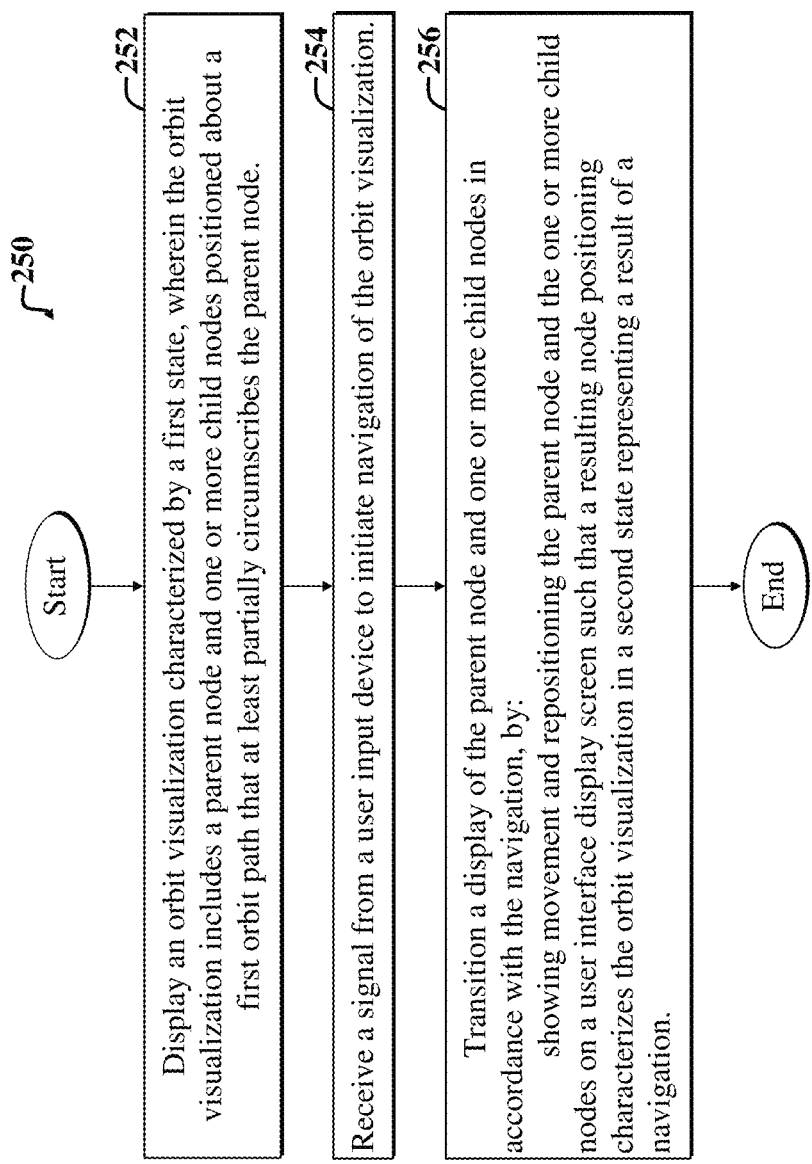
FIG. 14 is a flow diagram of a first example method adapted for use with the embodiments of FIGS. 1-13.

FIG. 14 is a flow diagram of a first example method 250 adapted for use with the embodiments of FIGS. 1-13. The first example method 250 involves the transitioning of a displayed visualization from a first state to a second state.

The first example method 250 includes an initial displaying step 252, which involves displaying an orbit visualization. The displayed orbit visualization includes, when in a first state, a parent node and one or more child nodes positioned about a first orbit path that at least partially circumscribes the parent node.

A subsequent signal-receiving step 254 includes receiving a signal from a user mechanism to initiate navigation of the orbit visualization.

Next, a transitioning step 256 includes transitioning display of the parent node and one or more child nodes in accordance with the navigation. The transition involves animating repositioning of the parent node and the one or more child nodes on a UI display screen such that a resulting node positioning characterizes the orbit visualization in a second state. The second state represents a result of a navigation, and the resulting orbit visualization corresponds to a navigated-to location in the associated UI display screen.

Note that the method 250 may be altered, without departing from the scope of the present teachings. For example, the method 250 may be augmented to specify that the navigation represents a downward navigation of hierarchically related data characterized by the orbit visualization.

The showing movement step may involve animating a separation of one or more petals of a selected node of the orbit visualization from the selected node, wherein the selected node represents a node that is selected via the signal from the user mechanism used to initiate navigation.

The process of animating a separation may include illustrating movement of the one or more petals from an outer edge of the selected node and onto a second orbit path about the selected node. The process of animating a separation may further include illustrating movement of the one or more petals in combination with movement of the selected node toward a central portion of the orbit visualization.

Alternatively, the method 250 may specify that the navigation represents an upward navigation of hierarchically related data characterized by the orbit visualization. The step 256 involving animating or showing movement may further include animating a combining of one or planets of a selected node of the orbit visualization with the selected node, such that the one or more planets are shown transitioning to become one or more petals of the selected node. The process involving animating a combining may further include moving the selected node and the one or more planets away from a center of the orbit visualization.

The received signal in the signal-receiving step 254 may indicate a selected node and further indicate that the selected node shall be characterized by an isolation mode when the orbit visualization transitions to the second state, such that no nodes that are superior to the selected node are illustrated in the orbit visualization when the orbit visualization is in the second state.

Figure 15:
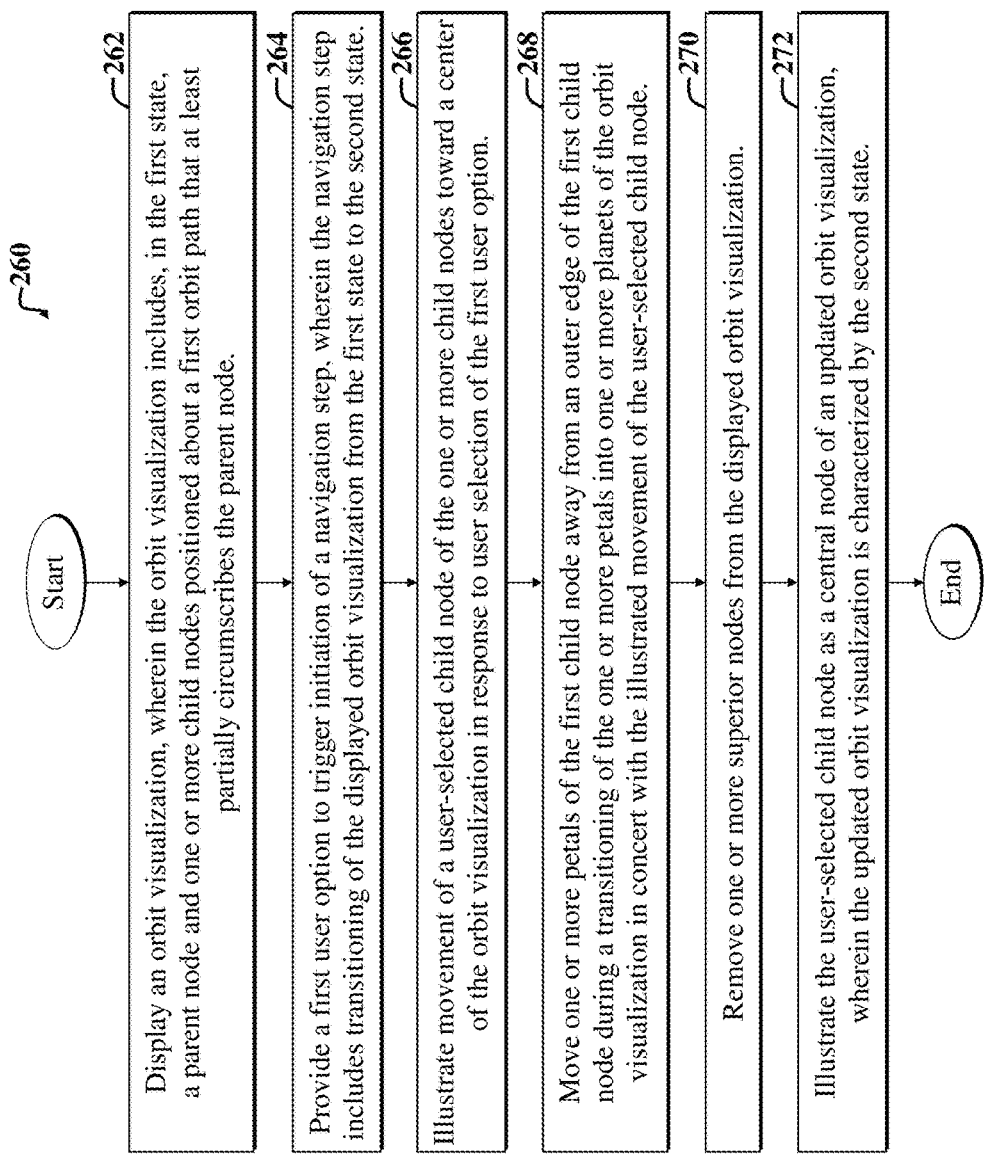
FIG. 15 is a flow diagram of a second example method adapted for use with the embodiments of FIGS. 1-14.

FIG. 15 is a flow diagram of a second example method adapted for use with the embodiments of FIGS. 1-14. The second example method 260 involves transitioning of a displayed visualization from a first state to a second state.

The second example method 260 includes a first step 262, which involves displaying an orbit visualization, wherein the orbit visualization includes, in the first state, a parent node and one or more child nodes positioned about a first orbit path that at least partially circumscribes the parent node.

A second step 264 includes providing a first user option to trigger initiation of a navigation step, wherein the navigation step includes transitioning of the displayed orbit visualization from the first state to the second state.

A third step 266 includes illustrating movement of a user-selected child node of the one or more child nodes toward a center of the orbit visualization in response to user selection of the first user option.

A fourth step 268 includes moving one or more petals of the first child node away from an outer edge of the first child node during a transitioning of the one or more petals into one or more planets of the orbit visualization in concert with the illustrated movement of the user-selected child node.

A fifth step 270 includes selectively removing from the displayed orbit visualization, one or more superior nodes of the visualization.

A sixth step 272 includes illustrating the user-selected child node as a central node of an updated orbit visualization, wherein the updated orbit visualization is characterized by the second state.

Note that the second example method 260 may be altered, without departing from the scope of the present teachings. For example, the second example method 260 may be augmented to further include displaying a parent node of the central node in a corner of the orbit visualization when the orbit visualization is in the second state.

The method 260 may further include displaying a second path about the central node in combination with a first path about the parent node, wherein the parent node is confined to the first path, and the one or more child nodes originating from the one or more petals are confined to the second path.

The method 260 may further include providing a second user option to move the one or more child nodes along the second path. A third user option may enable a user to trigger movement of the central node about the first path.

The method 260 may be further augmented to specify that each node of the orbit visualization characterizes a computing object. The computing object may represent a data object that includes information pertaining to one or more enterprise personnel.

The orbit visualization may characterize an organizational hierarchy of an enterprise. The parent node may represent a computing object characterizing an enterprise manager. In addition, the one or more child nodes may represent one or more computing objects characterizing one or more direct reports to the enterprise manager. The navigation may include navigating downward and/or upward in a hierarchy represented by the orbit visualization.

Figure 16:
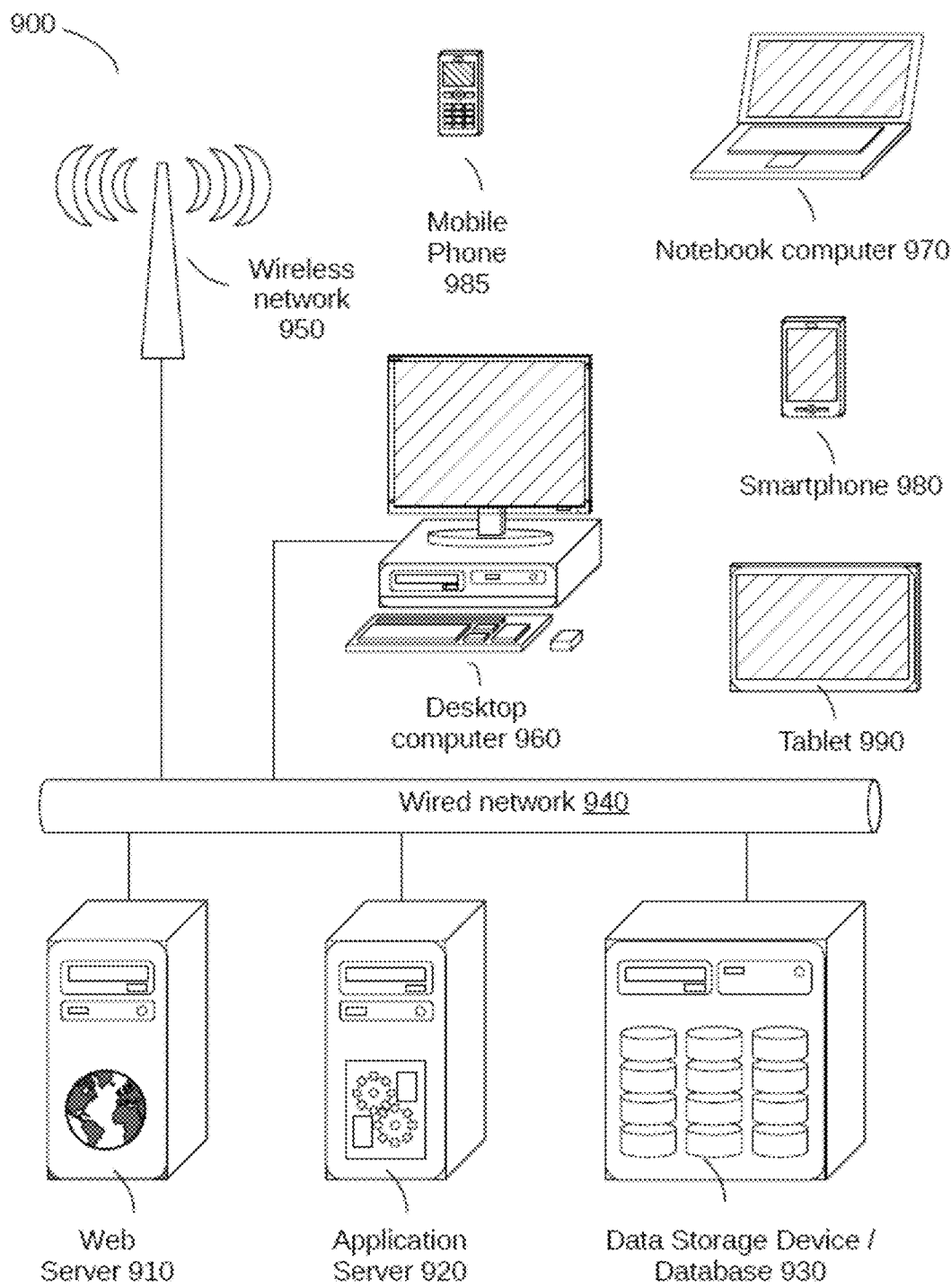
FIG. 16 is a general block diagram of a system for implementing the embodiments of FIGS. 1-7.

FIG. 16 is a general block diagram of a system for implementing the embodiments of FIGS. 1-15. The example system 900 is capable of generating and displaying orbit visualizations according to embodiments of the invention. Embodiments may be implemented as standalone applications (for example, residing in a user device) or as web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and user interfaces, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL (Structured Query Language) format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

Although the description has been described with respect to particular embodiments thereof, these particular embodiments are merely illustrative, and not restrictive. For example, while certain embodiments are discussed herein with respect to use of hierarchical visualizations to display enterprise data via mobile device displays, embodiments are not limited thereto. For example, embodiments may be employed with desktop displays and may be used to illustrate and interact with data other than enterprise-related data, without departing from the scope of the present teachings.

Certain embodiments may respond to changes in user device screen orientation, for instance they may change an orientation of the swim lane or of the panel, or they may change a number of simultaneously displayed tiles.

Certain embodiments may limit parts of a hierarchy viewable for a user based on a user authorization level. And embodiments may limit the information—contained in a data item (should be "shown in association with a node")—that is accessible for reading or writing by a user, based on the user's authorization level.

Certain embodiments may further allow for user interaction in various other ways. Some user input gestures may be tied to functions that intuitively correspond to the gesture, such as scrolling upon receiving a user swipe input in the direction of the visualization orientation. Other user inputs may be tied to functions based on a correspondence in frequency of use, such as using a tap gesture to activate a card and navigate in the hierarchy.

More generally, since any user input could be tied to any orbit visualization function, a user input may be tied to a function based on the need to provide user-friendly interaction capabilities. Since functionality requirements may vary based on the types of hierarchy presented and based on an application in which an orbit visualization may be used, different embodiments may provide different mappings between user inputs and visualization functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for transitioning a displayed visualization from a first state to a second state in a computing environment, the computing environment including one or more computing devices in communication with a software application, wherein the software application executes software, wherein the software provides displayable information accessible to the one or more computing devices, a computing device of the one or more computing devices executing the steps of the method, the method comprising:

determining at least four consecutive hierarchical levels of data objects to display via the displayed visualization;

presenting an orbit visualization in the displayed visualization;

simultaneously displaying, in the orbit visualization, the at least four consecutive hierarchy levels of the data objects as a group of nodes allocated to a first tier level, a second tier level, a third tier level, and a fourth tier level coinciding with the at least four consecutive hierarchy levels, displaying a first set of the at least four consecutive hierarchy levels using a first set of nodes from the group of nodes configured as a first set of planets using a non-overlapping hierarchical display of the first set of nodes, and a second set of the four tier levels using a second set of nodes from the group of nodes configured as a second set of planets that partially overlap using an overlapping hierarchical display simulating visual depth between the second set of nodes included in the second set of the four tier levels;

displaying a first node from the first set of nodes positioned in a corner of the orbit visualization at the first tier level representing a first hierarchical level of the at least four hierarchical levels;

displaying a second node from the first set of nodes as a planet from the first set of planets at the second tier level representing a second hierarchical level, wherein the second node is confined to a first planetary position defined by a corresponding second orbit path that at least partially circumscribes the first node;

displaying from the second set of nodes a plurality of parent nodes as a second set of planets positioned at the third tier level representing a third hierarchy level and confined to a second planetary position defined by a corresponding third orbit path at least partially circumscribing the second node, wherein at least two parent nodes of the plurality of parent nodes have child nodes that are included in the second set of nodes, wherein the child nodes are presented as a third set of planets positioned at the fourth tier level representing data objects at a fourth hierarchy level;

wherein a first parent node from the second set of nodes has at least one child node positioned at the fourth tier level in a fourth orbit path circumscribing the first parent node, wherein the fourth orbit path visually represents the fourth tier level, and a second parent node which includes one or more child nodes visually positioned partially below the second parent node in a third planetary position configured to position the one or more child nodes about a boundary of the second parent node to visually represent the one or more child nodes as individual petals disposed about the boundary of the second parent node, wherein the individual petals are configured to simulate visual depth to visually represent an overlapping hierarchy display of the one or more child nodes positioned at the fourth tier level;

receiving a gesture input from a user to set the second parent node as a selected node;

when in a first state, in response to a two-finger separation touch gesture signal applied to the selected node by the user, triggering an animation positioning the one or more child nodes from the third planetary position to a fourth planetary position defined by a fifth orbit path that at least partially circumscribes the selected node, wherein the fifth orbit path visually represents the one or more child nodes as the third set of planets positioned at the fourth tier level on the fifth orbit path;

receiving a position touch gesture signal from a user input mechanism via a second transition motion gesture across the display to initiate navigation of the orbit visualization to a second state;

transitioning display of the selected node and the one or more child nodes in accordance with the navigation from the first state to the second state, by:

initiating a navigation animation configured to visually alter the orbit visualization form the first state to the second state through animation by: removing the first node from the corner of the displayed visualization;

replacing the first node with the second node by positioning the second node from a first location in the displayed visualization to the corner of the displayed visualization;

transitioning the selected node and the one or more child nodes from a second location in the displayed visualization to the first location on the display; simultaneously removing one or more unselected parent nodes from the third orbit path and transitioning the one or more unselected parent nodes off the display; and in response to receiving a tap and hold touch gesture signal, displaying a collection of controls comprising at least an isolate control configured when selected by a isolate control touch gesture signal to remove remaining nodes from the first set of nodes from the displayed visualization upon transitioning to the second state.

2. The method of claim 1, wherein the navigation represents a downward navigation of hierarchically related data characterized by the orbit visualization in the non-overlapping hierarchical display.

3. The method of claim 2, wherein the navigation animation includes animating a separation of the individual petals of the selected node of the orbit visualization from the selected node.

4. The method of claim 3, wherein animating a separation includes illustrating movement of the individual petals from the third planetary position along the boundary defined by an outer edge of the selected node and onto a fifth orbit path about the selected node representing the fourth tier level.

5. The method of claim 4, wherein animating a separation includes illustrating movement of the individual petals in combination with movement of the selected node toward the second location of the orbit visualization.

6. The method of claim 1, wherein the navigation represents an upward navigation of hierarchically related data characterized by the orbit visualization.

7. The method of claim 6, wherein the navigation animation includes animating a combining of the one or more child nodes of the selected node with the selected node, such that the one or more child nodes are shown transitioning from the fourth planetary position to the third planetary position to become the individual petals of the selected node, wherein the individual petals represent the fourth tier level.

8. The method of claim 7, wherein animating a combining includes moving the selected node and the one or more planets toward the second location in response to a pinch touch gesture signal in combination with a two-finger swipe gesture signal.

9. The method of claim 1, wherein the tap and hold touch gesture signal indicates a selected node and further indicates that the selected node shall be characterized by an isolation mode when the orbit visualization is characterized in the second state, such that no nodes from the group of nodes that are superior to the selected node are illustrated in the orbit visualization when the orbit visualization is in the second state.

10. The method of claim 1, further including:
providing a first user option to trigger initiation of a navigation step, wherein the navigation step includes transitioning of the orbit visualization from the first state to the second state;
establishing the second location at a center of the orbit visualization;
illustrating movement of the selected node toward the second location of the orbit visualization in response to user selection of the first user option;
animating motion of the individual petals of the selected node away from an outer edge of the selected node during a transitioning of the the individual petals the third set of planets in concert with the illustrated movement of the selected node;

in response to the tap and hold gesture, activating the isolation control to remove one or more superior nodes of the orbit visualization hierarchically positioned at a higher hierarchical level relative to the selected node; and illustrating the selected node as a central node of an updated orbit visualization, wherein the updated orbit visualization is characterized by the second state.

11. The method of claim 10, further including displaying the second node as a third parent node of the central node in the corner of the orbit visualization when the orbit visualization is in the second state.

12. The method of claim 11, further including displaying second orbit path about the central node in combination with a first orbit path about the third parent node, wherein the central node is confined to the first orbit path, and the one or more child nodes originating from the individual petals are confined to the second orbit path.

13. The method of claim 12, further including providing a second user option to move the one or more child nodes along the second orbit path.

14. The method of claim 12, further including providing a third user option to move the central node about the first orbit path.

15. The method of claim 1, wherein each node of the orbit visualization characterizes a computing object.

16. The method of claim 15, wherein the computing object represents a data object that includes information pertaining to one or more enterprise personnel, and wherein the orbit visualization characterizes an organizational hierarchy of an enterprise.

17. The method of claim 16, wherein the second parent node represents a computing object characterizing an enterprise manager, and wherein the one or more child nodes represent one or more computing objects characterizing one or more direct reports to the enterprise manager.

18. The method of claim 1, wherein the navigation includes rotating the one or more child nodes about the selected node and navigating downward in a hierarchy represented by a transition of the one or more child nodes between the third planetary position and the forth planetary position in response to the two-finger separation touch gesture signal in combination with a third transition motion gesture signal.

19. An apparatus for transitioning a displayed visualization from a first state to a second state in a computing environment, the computing environment including one or more computing devices in communication with a software application, wherein the software application executes software, wherein the software provides displayable information accessible to the one or more computing devices, a computing device of the one or more computing devices configured to perform operations comprising:

determining at least four consecutive hierarchical levels of data objects to display via the displayed visualization;

presenting an orbit visualization in the displayed visualization;

simultaneously displaying, in the orbit visualization, the at least four consecutive hierarchy levels of the data objects as a group of nodes allocated to a first tier level, a second tier level, a third tier level, and a fourth tier level coinciding with the at least four consecutive hierarchy levels, displaying a first set of the at least four consecutive hierarchy levels using a first set of nodes from the group of nodes configured as a first set of planets using a non-overlapping hierarchical display of the first set of nodes, and a second set of the four tier levels using a second set of nodes from the group of nodes configured as a second set of planets that partially overlap using an overlapping hierarchical display simulating visual depth between the second set of nodes included in the second set of the four tier levels;

displaying a first node from the first set of nodes positioned in a corner of the orbit visualization at the first tier level representing a first hierarchical level of the at least four hierarchical levels;

displaying from the second set of nodes a plurality of parent nodes as a second set of planets positioned at the third tier level representing a third hierarchy level and confined to a second planetary position defined by a corresponding third orbit path at least partially circumscribing the second node, wherein at least two parent nodes of the plurality of parent nodes have child nodes that are included in the second set of nodes, wherein the child nodes are presented as a third set of planets positioned at the fourth tier level representing data objects at a fourth hierarchy level;

wherein a first parent node from the second set of nodes has at least one child node positioned at the fourth tier level in a fourth orbit path circumscribing the first parent node, wherein the fourth orbit path visually represents the fourth tier level, and a second parent node which includes one or more child nodes visually positioned partially below the second parent node in a third planetary position configured to position the one or more child nodes about a boundary of the second parent node to visually represent the one or more child nodes as individual petals disposed about the boundary of the second parent node, wherein the individual petals are configured to simulate visual depth to visually represent an overlapping hierarchy display of the one or more child nodes positioned at the fourth tier level;

receiving a gesture input from a user to set the second parent node as a selected node;

when in a first state, in response to a two-finger separation touch gesture signal applied to the selected node by the user, triggering an animation positioning the one or more child nodes from the third planetary position to a fourth planetary position defined by a first fifth orbit path that at least partially circumscribes the selected node, wherein the fifth orbit path visually represents the one or more child nodes as the third set of planets positioned at the fourth tier level on the fifth orbit path;

receiving a position touch gesture signal from a user input mechanism via a second transition motion gesture across the display to initiate navigation of the orbit visualization to a second state; and transitioning display of the parent node and one or more child nodes in accordance with the navigation from the first state to the second state, by:

initiating a navigation animation configured to visually alter the orbit visualization form the first state to the second state through animation by:

removing the first node from the corner of the displayed visualization;

replacing the first node with the second node by positioning the second node from a first location in the displayed visualization to the corner of the displayed visualization;

transitioning the selected node and the one or more child nodes from a second location in the displayed visualization to the first location on the display;

simultaneously removing one or more unselected parent nodes from the third orbit path and transitioning the one or more unselected parent nodes off the display; and in response to receiving a tap and hold touch gesture signal, displaying a collection of controls comprising at least an isolate control configured when selected by a isolate control touch gesture signal to remove remaining nodes from the first set of nodes from the displayed visualization upon transitioning to the second state.

20. A non-transitory storage medium including instructions executable by one or more computing devices of an enterprise computing environment for transitioning a displayed visualization from a first state to a second state in the enterprise computing environment, the enterprise computing environment including a computing device of the one or more computing devices in communication with a software application, wherein the software application executes software, wherein the software application provides displayable information accessible to the one or more computing devices, the non-transitory storage medium including instructions for:

determining at least four consecutive hierarchical levels of data objects to display via the displayed visualization;

presenting an orbit visualization in the displayed visualization;

simultaneously displaying, in the orbit visualization, the at least four consecutive hierarchy levels of the data objects as a group of nodes allocated to a first tier level, a second tier level, a third tier level, and a fourth tier level coinciding with the at least four consecutive hierarchy levels, displaying a first set of the at least four consecutive hierarchy levels using a first set of nodes from the group of nodes configured as a first set of planets using a non-overlapping hierarchical display of the first set of nodes, and a second set of the four tier levels using a second set of nodes from the group of nodes configured as a second set of planets that partially overlap using an overlapping hierarchical display simulating visual depth between the second set of nodes included in the second set of the four tier levels;

displaying a first node from the first set of nodes positioned in a corner of the orbit visualization at the first tier level representing a first hierarchical level of the at least four hierarchical levels;

displaying a second node from the first set of nodes as a planet from the first set of planets at the second tier level representing a second hierarchical level, wherein the second node is confined to a first planetary position defined by a corresponding second orbit path that at least partially circumscribes the first node;

displaying from the second set of nodes a plurality of parent nodes as a second set of planets positioned at the third tier level representing a third hierarchy level and confined to a second planetary position defined by a corresponding third orbit path at least partially circumscribing the second node, wherein at least two parent nodes of the plurality of parent nodes have child nodes that are included in the second set of nodes, wherein the child nodes are presented as a third set of planets positioned at the fourth tier level representing data objects at a fourth hierarchy level;

wherein a first parent node from the second set of nodes has at least one child node positioned at the fourth tier level in a fourth orbit path circumscribing the first parent node, wherein the fourth orbit path visually represents the fourth tier level, and a second parent node which includes one or more child nodes visually positioned partially below the second parent node in a third planetary position configured to position the one or more child nodes about a boundary of the second parent node to visually represent the one or more child nodes as individual petals disposed about the boundary of the second parent node, wherein the individual petals are configured to simulate visual depth to visually represent an overlapping hierarchy display of the one or more child nodes positioned at the fourth tier level;

receiving a gesture input from a user to set the second parent node as a selected node;

when in a first state, in response to a two-finger separation touch gesture signal applied to the selected node by the user, triggering an animation positioning the one or more child nodes from the third planetary position to a fourth planetary position defined by a fifth orbit path that at least partially circumscribes the selected node, wherein the fifth orbit path visually represents the one or more child nodes as the third set of planets positioned at the fourth tier level on the fifth orbit path;

receiving a position touch gesture signal from a user input mechanism via a second motion gesture across the display to initiate navigation of the orbit visualization to a second state;

transitioning display of the selected node and one or more child nodes in accordance with the navigation from the first state to the second state, by:

initiating a navigation animation configured to visually alter the orbit visualization form the first state to the second state through animation by:

removing the first node from the corner of the displayed visualization;

replacing the first node with the second node by positioning the second node from a first location in the displayed visualization to the corner of the displayed visualization;

transitioning the selected node and the one or more child nodes from a second location in the displayed visualization to the first location on the display; simultaneously removing one or more unselected parent nodes from the third orbit path and transitioning the one or more unselected parent nodes off the display; and in response to receiving a tap and hold touch gesture signal, displaying a collection of controls comprising at least an isolate control configured when selected by a isolate control touch gesture signal to remove remaining nodes from the first set of nodes from the displayed visualization upon transitioning to the second state.

* * * * *